United States Patent
Li et al.

(10) Patent No.: US 12,485,698 B2
(45) Date of Patent: Dec. 2, 2025

(54) EASY ASSEMBLING AND DISASSEMBLING WHEEL COMPONENT

(71) Applicant: Wonderland Switzerland AG, Steinhausen (CH)

(72) Inventors: Fangming Li, Steinhausen (CH); Haibo Zeng, Steinhausen (CH); Jialiang Yuan, Steinhausen (CH); Guanghui Zhao, Steinhausen (CH); Jiming Liu, Steinhausen (CH); Xiaoshuai Yang, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 809 days.

(21) Appl. No.: 17/583,173

(22) Filed: Jan. 24, 2022

(65) Prior Publication Data
US 2022/0234387 A1      Jul. 28, 2022

(30) Foreign Application Priority Data
Jan. 25, 2021    (CN) .......................... 202110102161.1

(51) Int. Cl.
| | |
|---|---|
| *B60B 3/18* | (2006.01) |
| *B60B 37/10* | (2006.01) |
| *B62B 7/04* | (2006.01) |

(52) U.S. Cl.
CPC ................ *B60B 3/18* (2013.01); *B60B 37/10* (2013.01); *B62B 7/04* (2013.01); *B62B 2205/10* (2013.01)

(58) Field of Classification Search
CPC .................................. B60B 37/10; B60B 3/18
See application file for complete search history.

(56) References Cited

U.S. PATENT DOCUMENTS

| 681,569 | A | * | 8/1901 | McNamara | ............. B60B 37/10 |
| | | | | | 301/120 |
| 1,436,493 | A | * | 11/1922 | Frey | ........................ B60B 37/10 |
| | | | | | 301/120 |

(Continued)

FOREIGN PATENT DOCUMENTS

| CN | 2222102 | 3/1996 |
| CN | 201220681 | 4/2009 |

(Continued)

OTHER PUBLICATIONS

"KIPP-Plug-in bolts with folding securing device", 2022, pp. 1-2, 2022 Heinrich Kipp Werk GmbH & Co. KG Alle Rechte vorbehalten. (https://www.kippwerk.de/de/de/produkte/bedienteile-normelemente/federnde-druckstucke-arretierbolzen-kugelsperrbolzen/k0776-steckbolzen-klappsicherung.html), 2022.

(Continued)

*Primary Examiner* — Jason R Bellinger
(74) *Attorney, Agent, or Firm* — Winston Hsu

(57) ABSTRACT

The present disclosure provides an easy assembling and disassembling wheel component, including a wheel, a rotation shaft and an engaging member, wherein a mounting hole is disposed on a center of the wheel, an accommodating groove is disposed at one end of the rotation shaft, the engaging member is movably engaged in the accommodating groove and is swingable between a first position and a second position. When the engaging member is in the first position, the engaging member and the rotation shaft can pass through the mounting hole of the wheel; when the engaging member is in the second position, the rotation shaft is connected with and locked to the wheel. The easy assembling and disassembling wheel component according to the present disclosure has advantages of simple structure, quick and convenient assembling and disassembling. And, the (Continued)

present disclosure also provides five kinds of easy assembling and disassembling wheel components.

6 Claims, 31 Drawing Sheets

(56) References Cited

U.S. PATENT DOCUMENTS

| | | | | |
|---|---|---|---|---|
| 4,963,115 A * | 10/1990 | Stowell Davin | ........ | B60B 37/10 |
| | | | | 280/30 |
| 5,277,480 A | 1/1994 | Chiu | | |
| 5,716,107 A | 2/1998 | Parker | | |
| 5,800,022 A * | 9/1998 | Del Rosario | .......... | A63C 17/06 |
| | | | | 403/348 |
| 6,354,609 B1 | 3/2002 | Chen | | |
| 6,598,898 B2 * | 7/2003 | Chu | ......................... | B62B 1/12 |
| | | | | 280/DIG. 3 |
| 2003/0015858 A1 | 1/2003 | Chu | | |
| 2013/0200583 A1 | 8/2013 | Morris | | |
| 2023/0219369 A1 * | 7/2023 | Panigot | ..................... | B62B 1/12 |
| | | | | 280/650 |

FOREIGN PATENT DOCUMENTS

| | | |
|---|---|---|
| CN | 201626457 | 11/2010 |
| CN | 201761306 | 3/2011 |
| CN | 204236535 | 4/2015 |
| CN | 206012674 U | 3/2017 |
| CN | 111731039 | 10/2020 |
| CN | 212605371 | 2/2021 |
| GB | 1 250 262 A | 10/1971 |
| JP | 2020-50304 A | 4/2020 |

OTHER PUBLICATIONS

"HUG Technik Shop_Plug-in bolts with folding security", pp. 1-10. (https://www.hug-technik.com/shop/industriebedarf/Spanntechnik-Normelemente-Bedienteile/Federnde-Druckstuecke--Arretierbolzen--Kugelsperrbolzen/Steckbolzen/Steckbolzen-mit-Klappsicherung), 2022.
"Retaining clip for pressure hose _ Servicecenter", p. 1. (https://www.windhornkd.de/en/products/sage/parts-and-accessories/espresso/ses875-the-barista-express/wasserkreislauf/165718/halteklammer-fuer-druckschlauch), 2022.
Office action mailed/issued on Jul. 31, 2024 for CN application No. 202110102161.1, filing date: Jan. 25, 2021, pp. 1~7. ,Jul. 31, 2024.

* cited by examiner

EASY ASSEMBLING AND DISASSEMBLING WHEEL COMPONENT

BACKGROUND OF THE DISCLOSURE

1. Field of the Disclosure

The present disclosure relates to a stroller, and in particular to an easy assembling and disassembling wheel component, which has a simple structure and can be quickly and conveniently assembled and disassembled.

2. Description of the Prior Art

The existing stroller generally includes four wheel sets, in which the front two wheels are universal wheels and the rear two wheels are directional wheels, and each wheel set is pivotally connected to a wheel seat directly fixed to a supporting foot of the vehicle.

SUMMARY OF THE DISCLOSURE

The object of the present disclosure is to provide an easy assembling and disassembling wheel component, which has a simple structure and can be quickly and conveniently assembled and disassembled.

In order to achieve the above object, the present disclosure provides an easy assembling and disassembling wheel component, including a wheel, a rotation shaft and an engaging member, wherein a mounting hole is disposed on a center of the wheel, an accommodating groove is disposed on one end of the rotation shaft, the engaging member is movably engaged in the accommodating groove; the engaging member is swingable between a first position and a second position, when the engaging member is in the first position, the engaging member and the rotation shaft enable to pass through the mounting hole of the wheel; when the engaging member is in the second position, the rotation shaft is connected with and locked to the wheel.

The present disclosure provides the engaging member movably engaged in a connection portion of the rotation shaft. When the rotation shaft is connected to the wheel, the engaging member may be swung to a first position or a second position. When the engaging member is swung to the first position, the engaging member and the rotation shaft may pass through the mounting hole of the wheel so as to achieve the purpose of disassembling the wheel; when the engaging member is swung to the second position, the engaging member is engaged with the mounting hole, such that the wheel may not be disengaged from the rotation shaft, for achieving the purpose of connecting and locking the wheel. Thus, the wheel may be quickly assembled and disassembled by only operating the engaging member, which causes a simple structure and can achieve very convenient maintenance and use.

In an embodiment, the accommodating groove penetrates two lateral surfaces and an end surface of the rotation shaft, and the connection portion is disposed in the accommodating groove and passes through the engaging member.

In an embodiment, the first position is a position to which the engaging member is swung such that a length direction of the engaging member is the same as a central axis extension direction of the rotation shaft; the second position is a position to which the engaging member is swung such that the length direction of the engaging member intersects with the central axis extension direction of the rotation shaft and the engaging member presses against an edge of the mounting hole.

In an embodiment, the engaging member has an elongated ring-shaped structure.

Specifically, an elongated hole is formed in the middle of the engaging member, an engaging region is disposed in the middle of the elongated hole, and the connection portion is engaged with the engaging region when the rotation shaft is locked in the wheel.

In an embodiment, the connection portion is a connection shaft.

In an embodiment, the easy assembling and disassembling wheel component further includes a wheel cover for covering one side of the wheel to shield the engaging member. A positioning rib for positioning the engaging member is disposed on an inner side of the wheel cover.

An easy assembling and disassembling wheel component includes a wheel, a rotation shaft, an engaging member and an elastic element, wherein a mounting hole is disposed on a center of the wheel, an engaging groove is disposed on one end of the rotation shaft, the rotation shaft is able to extend into or get out of the mounting hole, the engaging member is movably disposed on one side of the wheel, the elastic element provides an elastic force for engaging the engaging member in the engaging groove, such that the rotation shaft is connected with and locked to the wheel, and the rotation shaft is unlocked with and separated from the wheel when the engaging member is disengaged from the engaging groove.

The present disclosure provides the engaging member movably engaged on the wheel, such that the engaging member may be moved to and engaged with the engaging groove of the rotation shaft when the rotation shaft is connected with the wheel, for achieving the purpose of locking the rotation shaft and the wheel. When the engaging member is moved to disengage from the engaging groove, the purpose of unlocking the rotation shaft and the wheel is achieved. Thus, the wheel may be quickly assembled and disassembled by only operating the engaging member, which causes a simple structure and can achieve very convenient maintenance and use.

In an embodiment, an elongated hole, through which the rotation shaft passes, is disposed on the engaging member, one end of the elongated hole includes a first engaging region, the other end of the elongated hole includes a second engaging region, and the first engaging region and the second engaging region have different curvatures.

Specifically, a diameter of a curved edge of the first engaging region is smaller than a diameter of the rotation shaft, and a diameter of a curved edge of the second engaging region is larger than the diameter of the rotation shaft. Thus, when the rotation shaft is located on the first engaging region, the rotation shaft is engaged with an edge of the first engaging region, and when the rotation shaft is located on the second engaging region, the rotation shaft may directly pass through the second engaging region to disengage from the engaging member, for achieving the purpose of locking or unlocking.

In an embodiment, one end of the engaging member is pivotally connected to one side of the wheel, the other end of the engaging member includes an engaging region, the engaging member is engaged in the engaging groove after being rotated in a direction, and the engaging member is disengaged from the engaging groove after being rotated in another direction.

In an embodiment, a pushing portion extends from one side of the engaging member. The easy assembling and disassembling wheel component further includes a wheel cover slidably arranged in the middle of the wheel, and a driving portion is disposed on the wheel cover and is able to drive the pushing portion by pressing the wheel cover. The wheel cover is arranged to not only shield the engaging member to make the appearance of the wheel more beautiful and generous, but also may act as an operating member for operating the engaging member, thereby improving the convenience of operation.

Specifically, the driving portion includes a driving inclined surface, the pushing portion includes a matching inclined surface, and the driving inclined surface slidably abuts against the matching inclined surface. Using the driving inclined surface and the matching inclined surface may make the wheel cover to smoothly drive the engaging member, for further improving the convenience of operation.

An easy assembling and disassembling wheel component includes a wheel, a rotation shaft and an engaging member, a mounting hole is disposed on a center of the wheel, an engaging groove is disposed on one end of the rotation shaft, the rotation shaft is able to extend into or get out of the mounting hole, the engaging member is arranged on one side of the wheel and has an elastic portion, and the elastic portion elastically engages into the engaging groove and enables the rotation shaft to be connected with and locked to the wheel.

The present disclosure provides the engaging member, and an elastic portion is disposed on one end of the engaging member and is used to provide a spring-back property. Thus, when the elastic portion is in a natural state, the elastic portion may spring back to engage in the engaging groove of the rotation shaft, such that the rotation shaft is connected with and locked to the wheel; when the elastic portion is stretched under force, the elastic portion may be separated from the engaging groove of the rotation shaft, so as to unlock the rotation shaft from the wheel and further achieve the purpose of unlocking the wheel and the rotation shaft. Thus, the wheel may be quickly assembled and disassembled by only operating the elastic portion, which causes a simple structure and can achieve very convenient maintenance and use.

In an embodiment, the engaging member includes a U-shaped structure, and two ends of the U-shaped structure form the elastic portions.

In an embodiment, the easy assembling and disassembling wheel component further includes an operating member slidably arranged on one side of the wheel to push the elastic portion away from the engaging groove. Thus, the convenience of the operation may be improved.

Specifically, tail ends of the elastic portions extend out of guide portions, the operating member includes oblique holes, the guide portions are slidably arranged in the oblique holes to drive the elastic portions to open. By the arrangement of the guide portion, the operating member can more easily drive the elastic portion, thereby improving the convenience of the operation.

In an embodiment, the easy assembling and disassembling wheel component further includes a wheel cover arranged on one side of the wheel and covering on the operating member. The wheel cover is arranged to shield the engaging member to make the appearance of the wheel more beautiful and generous.

An easy assembling and disassembling wheel component includes a wheel, a rotation shaft, an engaging member and an elastic element, wherein one end of the rotation shaft is fixedly connected with a center of the wheel, the other end of the rotation shaft includes an engaging groove and is able to extend into or get out of a supporting foot of the frame, the engaging member is movably arranged on the supporting foot, the elastic element provides an elastic force for engaging the engaging member in the engaging groove, such that the rotation shaft is connected with and locked to the supporting foot, and the rotation shaft is unlocked with and separated from the supporting foot when the engaging member is disengaged from the engaging groove.

The present disclosure provides the engaging member for connecting the rotation shaft and the wheel, and the engaging member is movably arranged on the supporting foot. When the rotation shaft is connected to the supporting foot, the engaging member may be moved to the engaging groove of the rotation shaft and engaged in the engaging groove, for achieving the purpose of locking the wheel; when the engaging member is moved to be disengaged from the engaging groove, the purpose of unlocking the wheel is achieved. Thus, the wheel may be quickly assembled and disassembled by only operating the engaging member, which causes a simple structure and can achieve very convenient maintenance and use.

In an embodiment, an elongated hole, through which the rotation shaft passes, is disposed on the engaging member, one end of the elongated hole includes a first engaging region, the other end of the elongated hole includes a second engaging region, and the first engaging region and the second engaging region have different curvatures.

Specifically, a diameter of a curved edge of the first engaging region is smaller than a diameter of the rotation shaft, and a diameter of a curved edge of the second engaging region is larger than the diameter of the rotation shaft. Thus, when the rotation shaft is located at the first engaging region, the rotation shaft is able to engage with an edge of the first engaging region, and when the rotation shaft is located at the second engaging region, the rotation shaft may directly pass through the second engaging region and disengage from the engaging member, for achieving the purpose of locking and unlocking.

These and other objectives of the present disclosure will no doubt become obvious to those of ordinary skill in the art after reading the following detailed description of the preferred embodiment that is illustrated in the various figures and drawings.

DETAILED DESCRIPTION

The wheels are made of rubber material. When the wheels wear out after being used for a period of time and need to be replaced, ordinary users cannot manually replace the wheels since the connection of the wheel is inconvenient. For example, the hairpin type wheel set, which is currently and more commonly used on the market, needs to be disassembled and assembled with tools. For ordinary users, the assembly and disassembly of the wheel sets are very troublesome, the maintenance thereof is difficult, and the use thereof is inconvenient. So, the present disclosure provides an easy assembling and disassembling wheel component.

In order to explain in detail the technical contents, structural features and achieved effects of the present disclosure, the following detailed descriptions are given in conjunction with the embodiments and accompanying drawings.

Referring to FIGS. 1-7, the structure according to a first embodiment of the present disclosure is shown below.

Figure 1:
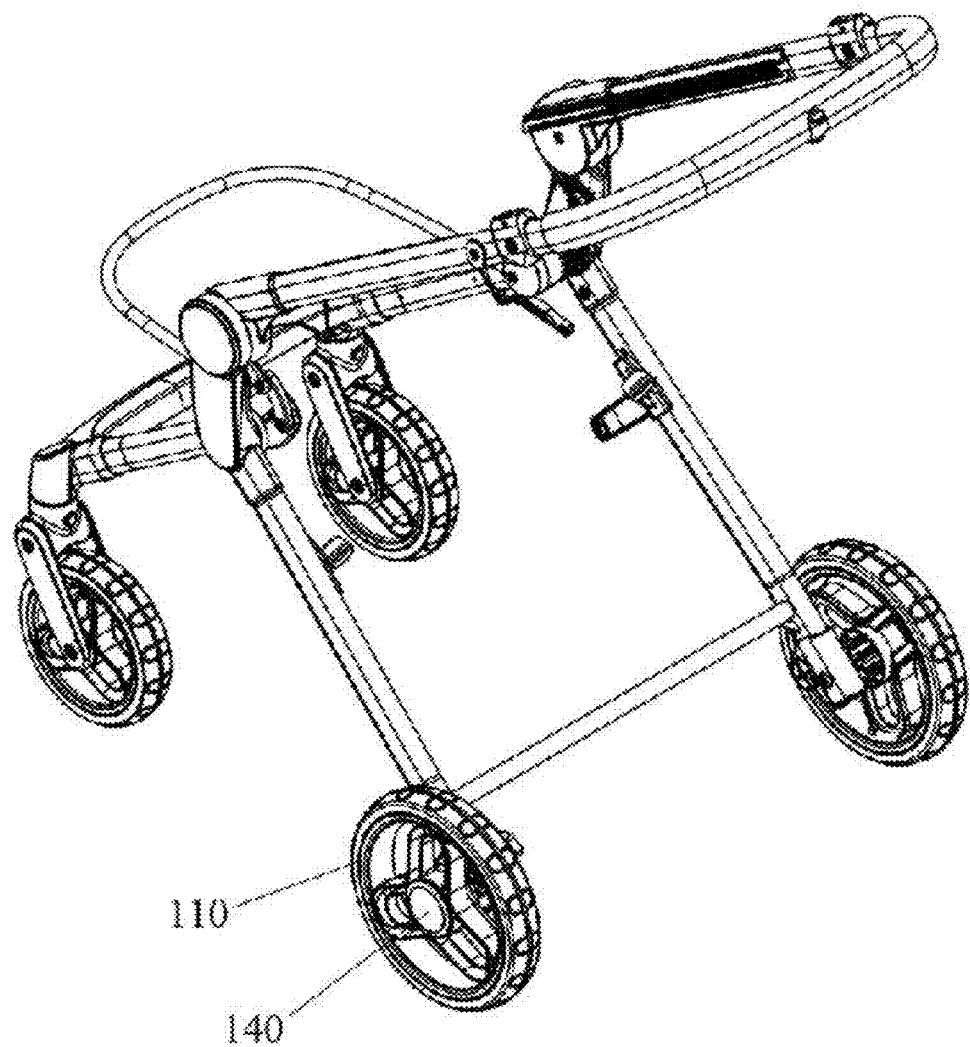
FIG. 1 is a state diagram of an easy assembling and disassembling wheel component according to a first embodiment of the present disclosure assembled on a frame.
Figure 2:
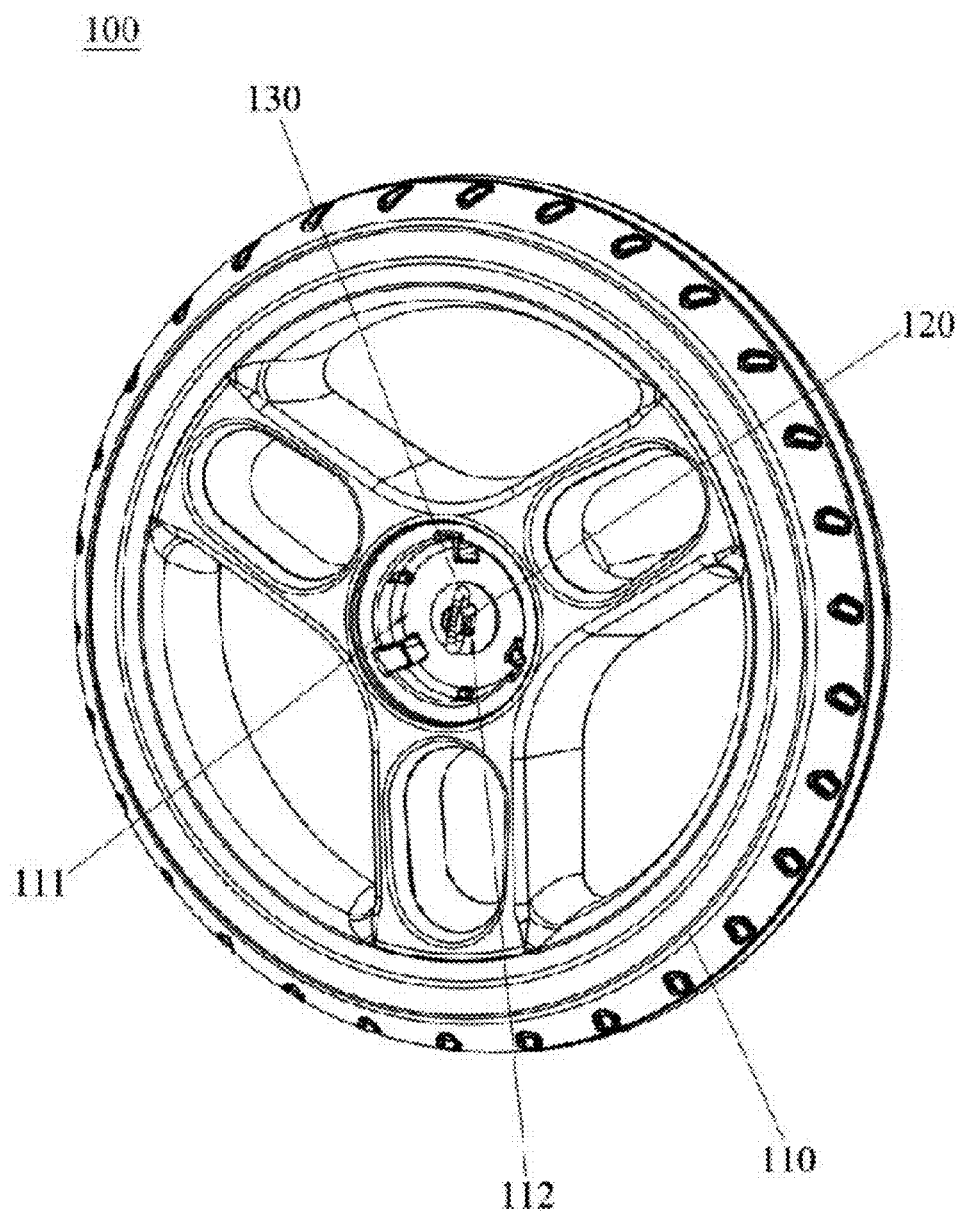
FIG. 2 is a structural diagram of the easy assembling and disassembling wheel component according to the first embodiment of the present disclosure.
Figure 3:
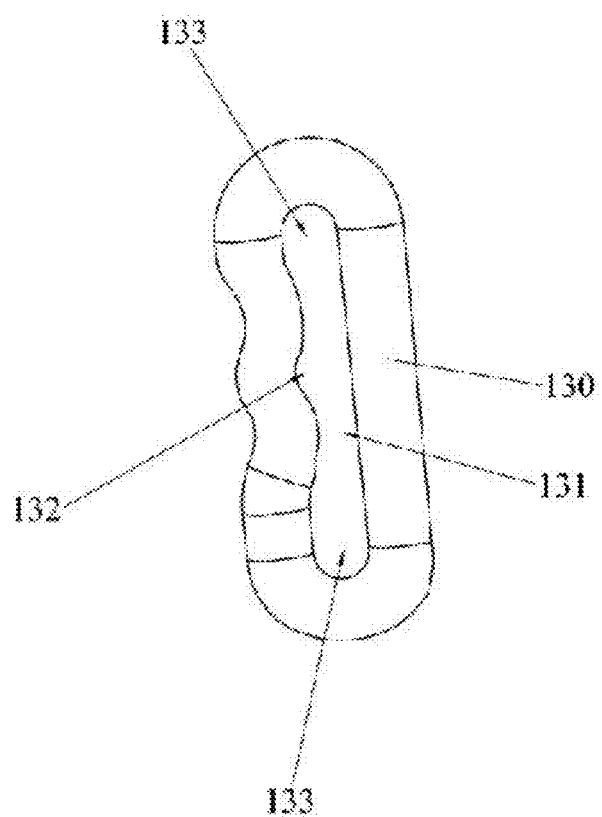
FIG. 3 is a structural diagram of an engaging member of the easy assembling and disassembling wheel component according to the first embodiment of the present disclosure.
Figure 4:
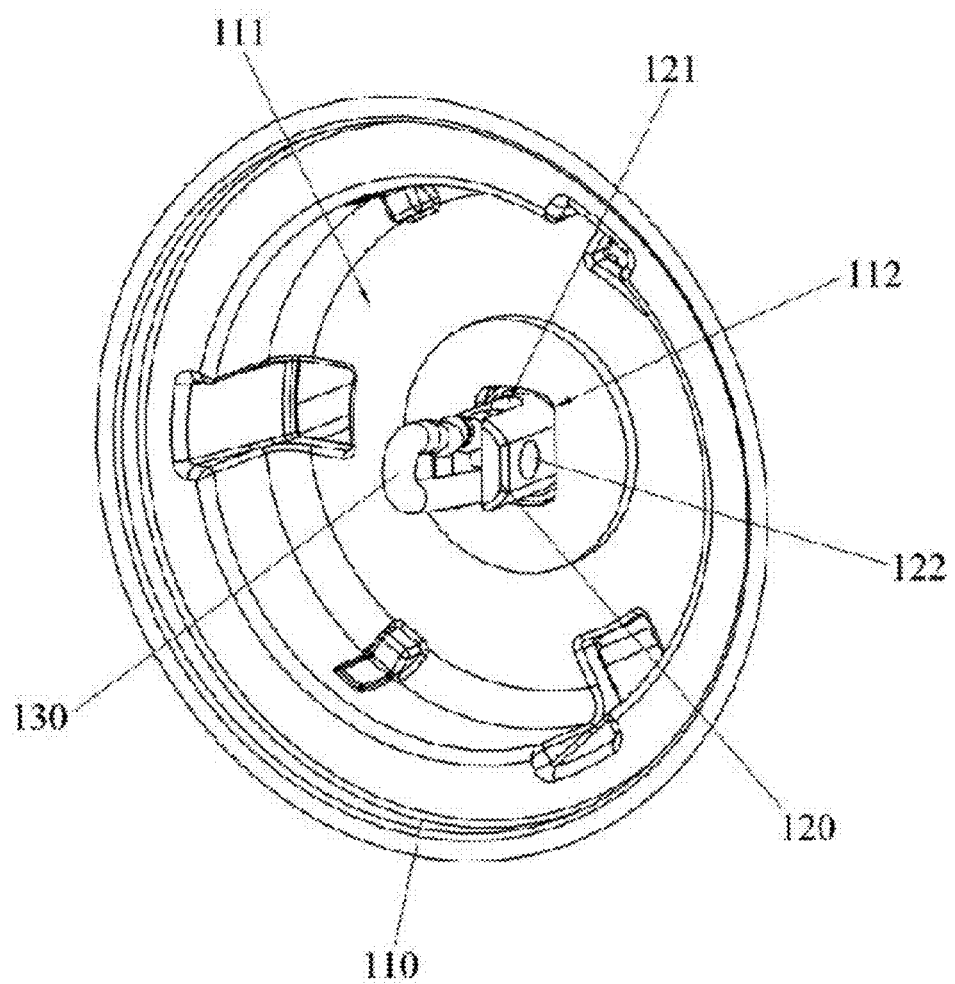
FIG. 4 is a state diagram of the engaging member of the easy assembling and disassembling wheel component according to the first embodiment of the present disclosure in an unlock position.
Figure 5:
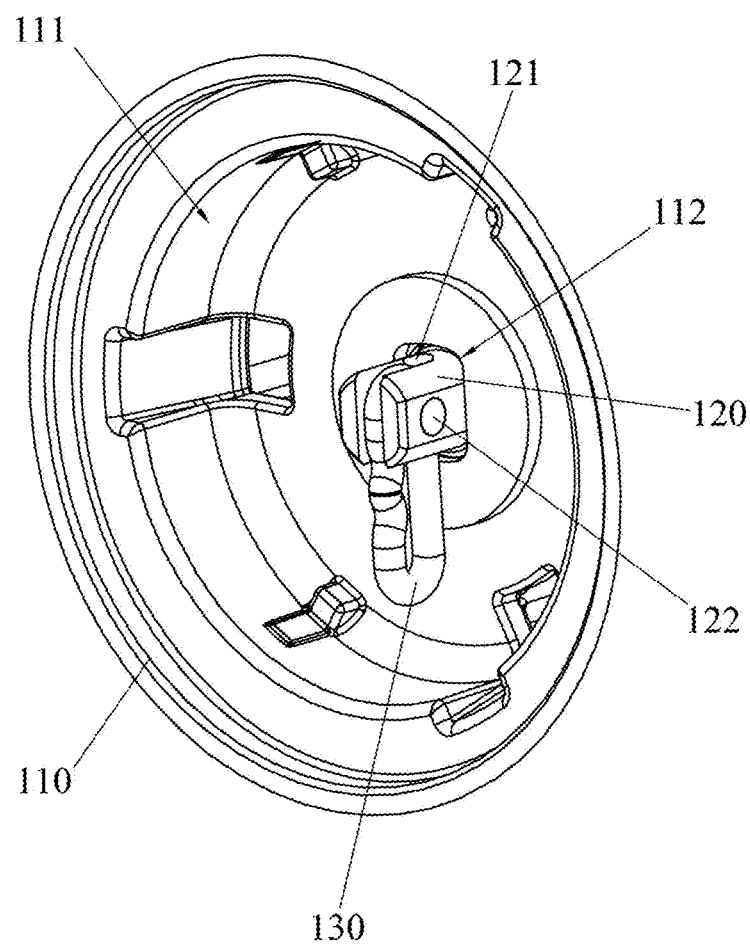
FIG. 5 is a state diagram of the engaging member of the easy assembling and disassembling wheel component according to the first embodiment of the present disclosure in a position between the unlock position and the lock position.
Figure 6:
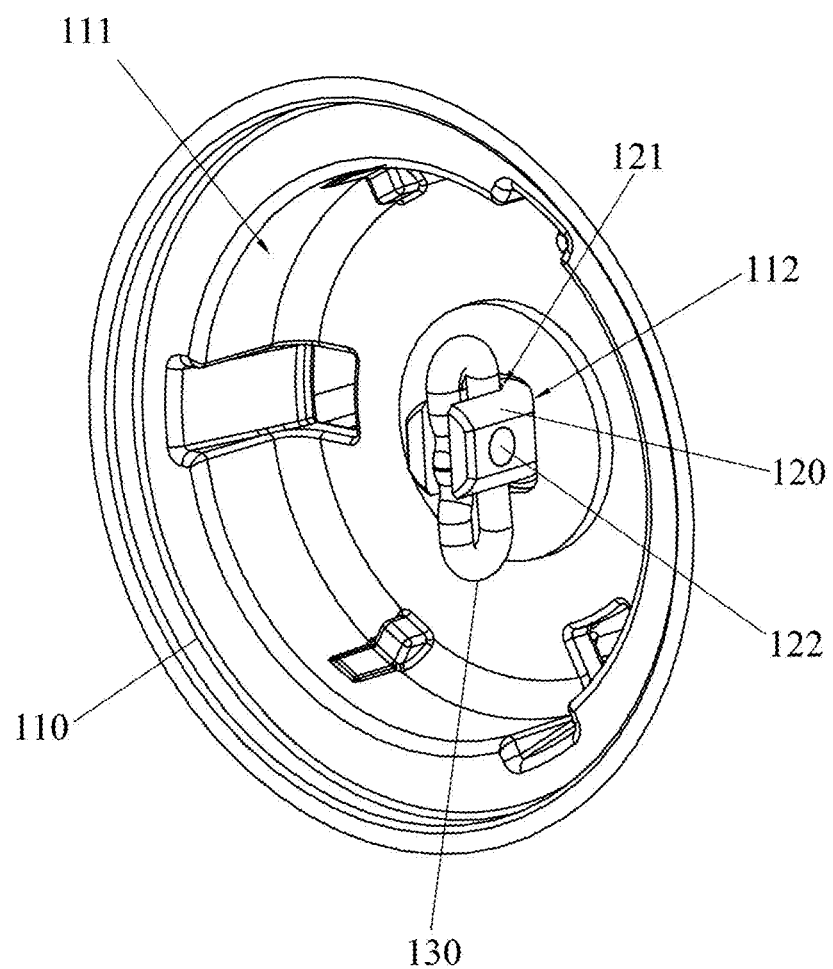
FIG. 6 is a state diagram of the engaging member of the easy assembling and disassembling wheel component according to the first embodiment of the present disclosure in the lock position.
Figure 7:
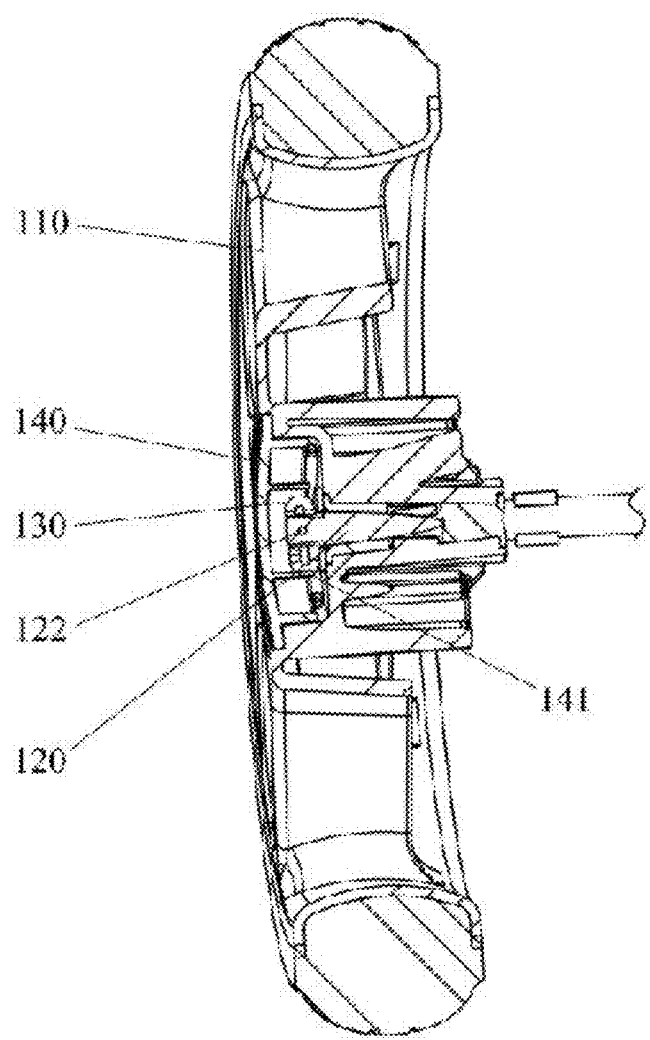
FIG. 7 is a cross-sectional view of the engaging member of the easy assembling and disassembling wheel component according to the first embodiment of the present disclosure in the lock position.
Figure 8:
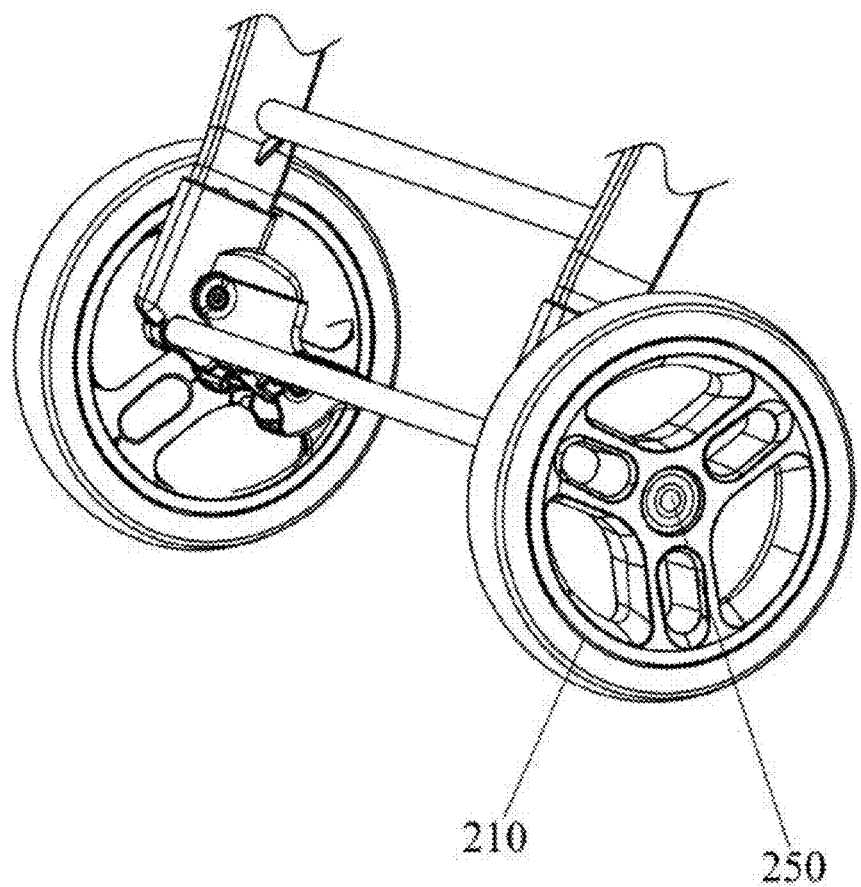
FIG. 8 is a state diagram of an easy assembling and disassembling wheel component according to a second embodiment of the present disclosure assembled on the frame.
Figure 9:
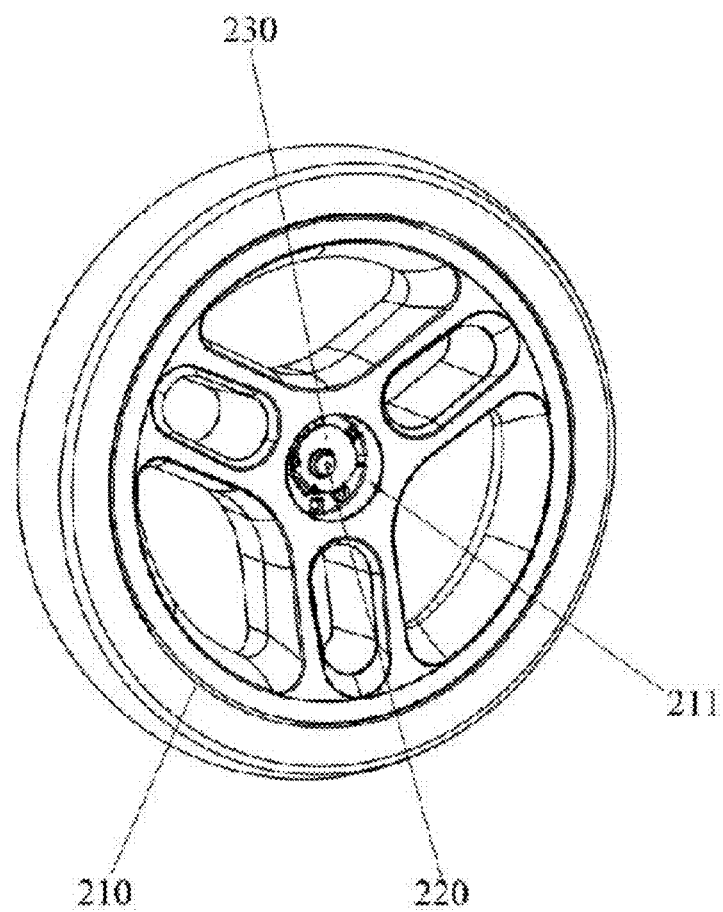
FIG. 9 is a structural diagram of the easy assembling and disassembling wheel component according to the second embodiment of the present disclosure.

Referring to FIGS. 1-3, the easy assembling and disassembling wheel component 100 according to the embodiment includes a wheel 110, a rotation shaft 120 and an engaging member 130, an accommodating chamber 111 is disposed on a center of the wheel 110, a mounting hole 112 is disposed on a center of the accommodating chamber 111, one end of rotation shaft 120 includes an accommodating groove 121 penetrating two lateral surfaces and an end surface thereof, and the other end of the rotation shaft 120 is connected to the frame. A connection portion 122 is disposed in the accommodating groove 121 and passes through the engaging member 130. The connection portion 122 is a connection shaft. The engaging member 130 is movably engaged in the accommodating groove 121; and the engaging member 130 may be swung between a first position and a second position. When the engaging member 130 is in the first position, the engaging member 130 and the rotation shaft 120 may pass through a mounting hole 112 of the wheel 110; when the engaging member 130 is in the second position, the rotation shaft 120 is connected with and locked to the wheel 110. The first position is a position to which the engaging member 130 is swung such that a length direction of the engaging member is the same as a central axis extension direction of the rotation shaft 120; the second position is a position to which the engaging member 130 is swung such that the length direction the engaging member 130 intersects with the central axis extension direction of the rotation shaft 120, and the engaging member 130 presses against an edge of the mounting hole 112.

Further as shown in FIG. 3, the engaging member 130 has an elongated ring-shaped structure. An elongated hole 131 is formed in the middle of the engaging member 130, an engaging region 132 is disposed in the middle of the elongated hole 131, arc-shape hole regions 133 are formed on two lateral sides thereof. When the rotation shaft 120 is locked in the wheel 110, the connection portion 122 is engaged with the engaging region 132. Specifically, an edge of the engaging member 130 is in a corrugated structure to form the engaging region 132, and has a certain elastic force. When the connection portion 122 reaches the corrugated structure, the corrugated structure is elastically stretched and allows the connection portion 122 to pass through; when the connection portion 122 passes over the corrugated structure, the corrugated structure springs back and the engaging region 132 engages with the connection portion 122.

The easy assembling and disassembling wheel component 100 further includes a wheel cover 140, which is covered on the accommodating chamber 111 of the wheel 110 to shield the engaging member 130. A positioning rib 141 for positioning the engaging member 130 is disposed on the inner side of the wheel cover 140.

Referring to FIGS. 4-7, when the wheel 110 needs to be assembled and locked, it is only necessary to swing the engaging member 130 to such a position that a length direction of the engaging member 130 is the same as a central axis extension direction of the rotation shaft 120, the wheel 110 is sleeved on the rotation shaft 120, and the rotation shaft 120 passes through the mounting hole 112. Afterwards, the engaging member 130 is swung to such a position that the length direction thereof is perpendicular to the central axis extension direction of the rotation shaft 120. At the same time, the engaging member 130 may be slid until that the engaging region 132 is engaged with the connection portion 122, and the engaging member 130 is engaged on a side of the wheel 110. Then, the rotation shaft 120 cannot get out of the mounting hole 112 due to the complete locking of the engaging member 130, and then the rotation shaft 120 may be connected with and locked to the wheel 110.

When the wheel 110 needs to be unlocked and disassembled, it is only necessary to force the engaging member 130 to move, so as to make the engaging region 132 move away from the connection portion 122 and then swing the engaging member 130, such that the length direction of the engaging member 130 is the same as the central axis extension direction of the rotation shaft 120. At this time, the rotation shaft 120 and the engaging member 130 may pass through the mounting hole 112, and the wheel 110 can be disengaged from the rotation shaft 120.

The present disclosure provides the engaging member 130, such that the engaging member 130 is movably engaged with the connection portion 122 of the rotation shaft 120. When the wheel 110 is connected with the rotation shaft 120, the engaging member 130 may be swung to such a position that the length direction thereof is the same as the central axis extension direction of the rotation shaft 120, or may be swung to such a position that the length direction thereof intersects with the central axis extension direction of the rotation shaft 120. Therefore, when the both are in the same direction, the engaging member 130 and the rotation shaft 120 may pass through the mounting hole 112 of the wheel 110 to achieve the purpose of disassembling the wheel 110; when the both intersect with each other, the engaging member 130 is engaged on the mounting hole 112, such that the wheel 110 cannot be disengaged from the rotation shaft 120, to achieve the purpose of connecting and locking the wheel 110. Thus, the wheel 110 may be quickly assembled and disassembled by only operating the engaging member 130, which causes a simple structure and can achieve very convenient maintenance and use.

As shown in FIGS. 8-12, the structure according to a second embodiment of the present disclosure is shown below.

Referring to FIGS. 8-11, the easy assembling and disassembling wheel component 200 according to the embodiment includes a wheel 210, a rotation shaft 220, an engaging member 230 and an elastic element 240, an accommodating chamber 211 is disposed on a center of the wheel 210, a mounting hole 212 is disposed in the middle of the accommodating chamber 211, an annular engaging groove 221 is disposed on one end of the rotation shaft 220 so that the rotation shaft 220 may extend into or get out of the mounting hole 212, and the engaging member 230 may move along a radial direction of the wheel 210 and is arranged on one side of the wheel 210. The elastic element 240 provides an elastic force for engaging the engaging member 230 in the engaging groove 221 so as to connect and lock the rotation shaft 220 to the wheel 210. The elastic element 240 is a compression spring, one end of which abuts against the engaging member 230, and the other end of which abuts against the wheel 210. The rotation shaft 220 may be unlocked and separated from the wheel 210 when the engaging member 230 is disengaged with the engaging groove 221.

Figure 11:
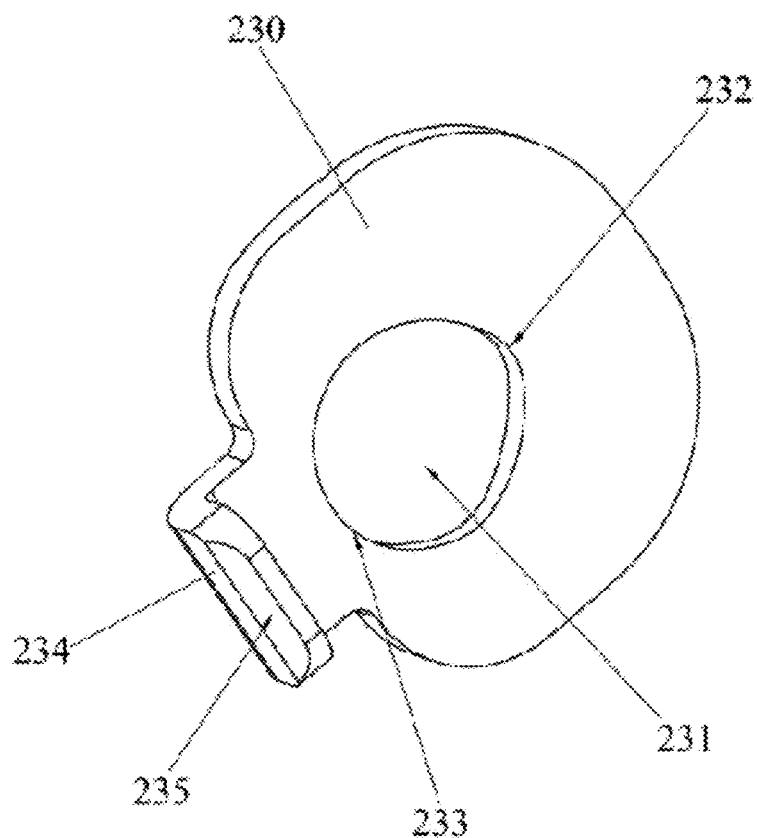
FIG. 11 is a structural diagram of the engaging member according to the second embodiment of the present disclosure.

Further as shown in FIG. 11, specifically, an elongated hole 231, through which the rotation shaft 220 passes, is disposed on the engaging member 230. One end of the elongated hole 231 includes a first engaging region 232, the other end thereof includes a second engaging region 233, and the first engaging region 232 and the second engaging region 233 have different curvatures. Specifically, the edge of the first engaging region 232 is in a circular arc shape, and the diameter of the curved edge of the first engaging region 232 is smaller than the diameter of the rotation shaft 220. The edge of the second engaging region 233 is in a circular arc shape, and the diameter of the curved edge of the second engaging region 233 is larger than the diameter of the rotation shaft 220. The edge of the elongated hole 231 between the first engaging region 232 and the second engaging region 233 is straight. In this way, when the rotation shaft 220 is at the first engaging region 232, the rotation shaft 220 is able to engage with the edge of the first engaging region 232; and when the rotation shaft 220 is at the second engaging region 233, the rotation shaft 220 may directly pass through the second engaging region 233 and disengage from the engaging member 230, for achieving the purpose of locking or unlocking.

Figure 12:
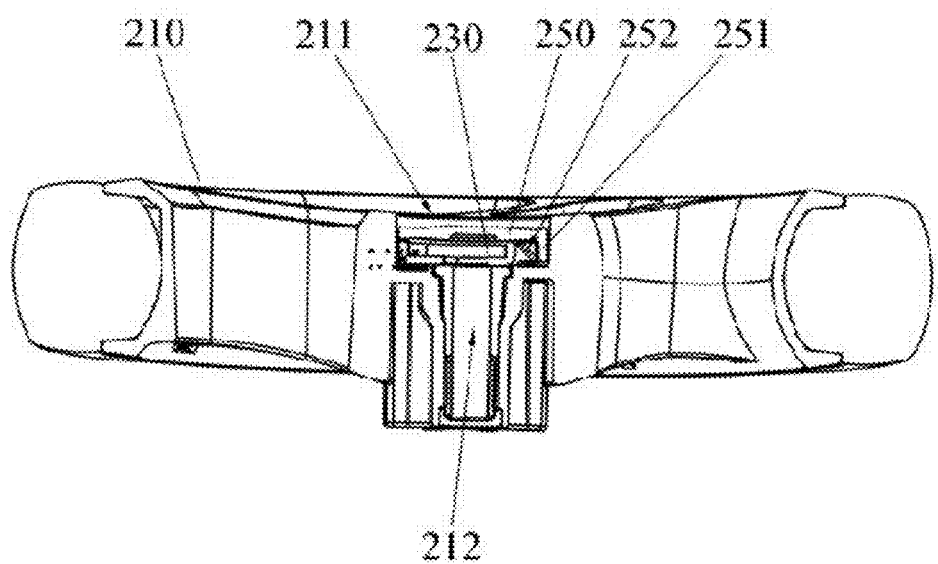
FIG. 12 is a state diagram of a wheel cover of the easy assembling and disassembling wheel component according to the second embodiment of the present disclosure after the wheel cover being pressed.
Figure 13:
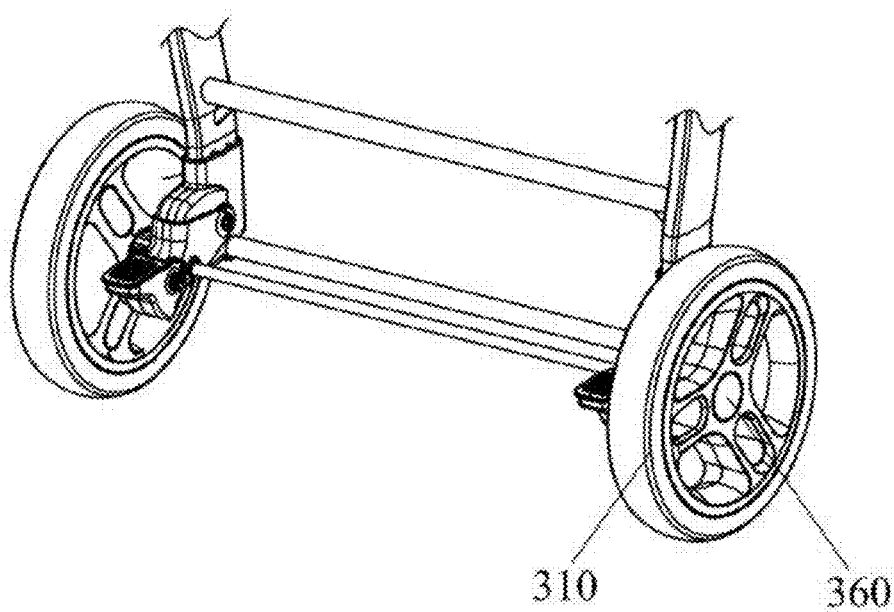
FIG. 13 is a state diagram of an easy assembling and disassembling wheel component according to a third embodiment of the present disclosure assembled on the frame.
Figure 14:
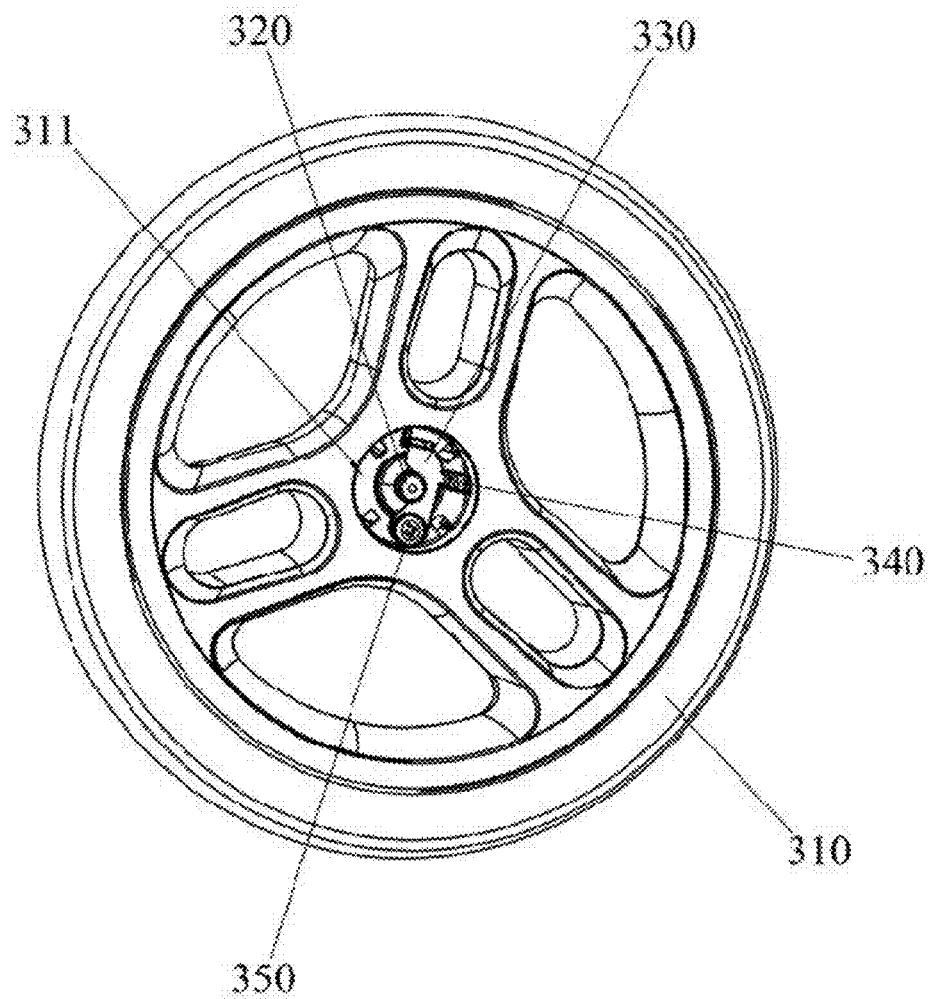
FIG. 14 is a structural diagram of the easy assembling and disassembling wheel component according to the third embodiment of the present disclosure.
Figure 15:
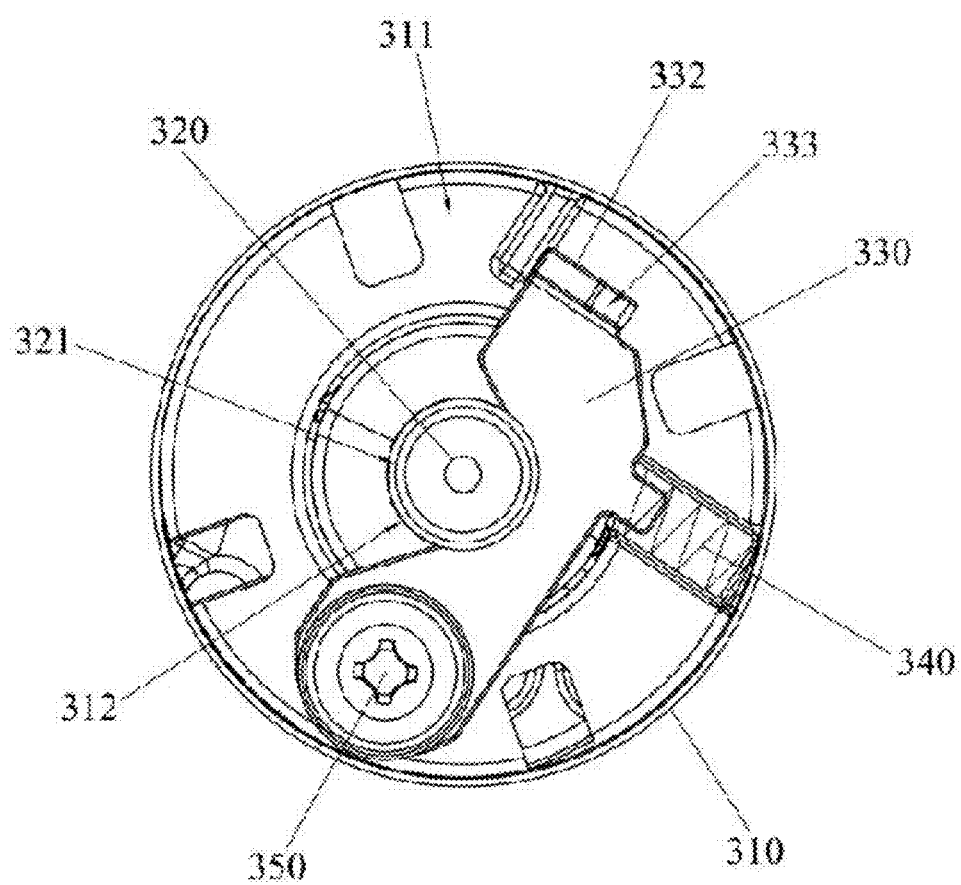
FIG. 15 is a structural diagram of an engaging member engaged on a rotation shaft according to the third embodiment of the present disclosure.

Further as shown in FIGS. 11 and 12, a pushing portion 234 extends from one side of the engaging member 230, and a matching inclined surface 235 is disposed on the pushing portion 234. The easy assembling and disassembling wheel component 200 further includes a wheel cover 250, which is arranged in the middle of the wheel 210 and may be slid along a central axis direction of the rotation shaft 220. The wheel cover 250 includes a driving portion 251, the driving portion 251 includes a driving inclined surface 252, and the driving inclined surface 252 abuts against and slides on the matching inclined surface 235. Pressing the wheel cover 250 along the axial direction of the rotation shaft 220 allows the driving portion 251 to drive the pushing portion 234 and thereby drive the engaging member 230 to slide. The arrangement of the wheel cover 250 may not only shield the engaging member 230 to make the appearance of the wheel 210 more beautiful and generous, but also be used as an operating member for operating the engaging member 230, thereby improving the convenience of operation. The use of the driving inclined surface 252 and the matching inclined surface 235 may allow the wheel cover 250 to drive the engaging member 230 more smoothly, and further improve the convenience of operation.

Figure 10:
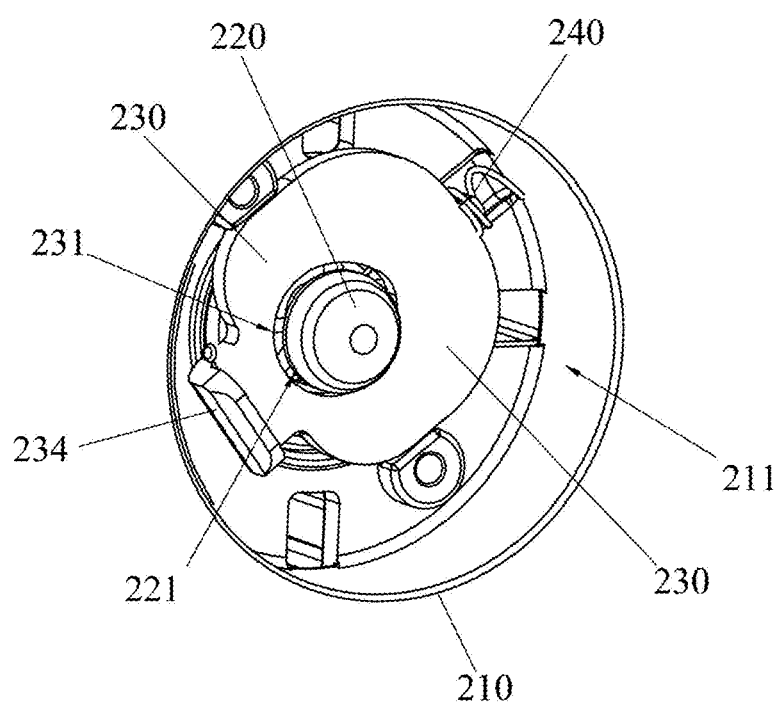
FIG. 10 is a structural diagram of an engaging member being engaged on a rotation shaft according to the second embodiment of the present disclosure.

Referring to FIGS. 10 and 11, when the wheel 210 needs to be assembled and locked, the wheel cover 250 pushes the engaging member 230 to slide by only pressing and turning the wheel cover 250, such that the second engaging region 233 directly faces to the mounting hole 212. At this time, the rotation shaft 220 passes through the mounting hole 212 and the second engaging region 233, and the wheel 210 is sleeved on the rotation shaft 220. After that, the engaging member 230 is released, and the engaging member 230 is restored under the elastic force of the elastic element 240. At this time, the engaging member 230 slides and the first engaging region 232 directly faces the mounting hole 212, and the edge of the first engaging region 232 is engaged in the engaging groove 221. Then, the rotation shaft 220 cannot get out of the mounting hole 212 due to the complete locking of the engaging member 230, and then the rotation shaft 220 may be connected with and locked to the wheel 210.

Referring to FIG. 12, when the wheel 210 needs to be unlocked and disassembled, it is only necessary to press the wheel cover 250, such that the wheel cover 250 drives the engaging member 230, and the engaging member 230 can be slid and compress the elastic element 240. The second engaging region 233 directly faces the mounting hole 212 again. At this time, the rotation shaft 220 is disengaged from the second engaging region 233 and the mounting hole 212, and the wheel 210 can be disengaged from the rotation shaft 220.

The present disclosure provides the engaging member 230, such that the engaging member 230 is movably arranged on the wheel 210. When the wheel 210 is connected with the rotation shaft 220, the engaging member 230 may be moved to the engaging groove 221 of the rotation shaft 220 and engaged with the engaging groove 221, so as to achieve the purpose of locking the wheel 210 and the rotation shaft 220; when the engaging member 230 is moved to disengage from the engaging groove 221, the purpose for unlocking the wheel 210 and the rotation shaft 220 is achieved. Thus, the wheel 210 may be quickly assembled and disassembled by only operating the engaging member 230, which causes a simple structure and can achieve very convenient maintenance and use.

As shown in FIGS. 13-19, the structure according to a third embodiment of the present disclosure is shown below.

Further as shown in FIGS. 13-16, the easy assembling and disassembling wheel component 300 according to the embodiment includes a wheel 310, a rotation shaft 320, an engaging member 330 and an elastic element 340. An accommodating chamber 311 is disposed in the middle of the wheel 310. A mounting hole 312 is disposed on a center of the accommodating chamber 311. An annular engaging groove 321 is disposed on one end of the rotation shaft 320, and the rotation shaft 320 is able to extend into or get out of the mounting hole 312. The engaging member 330 is arranged on one side of the wheel 310. One end of the engaging member 330 is pivotally connected to one side of the wheel 310 via a shaft pin 350, and the other end of the engaging member 330 includes an engaging region 331. The engaging region 331 is recessed. The engaging member 330 may be engaged in the engaging groove 321 or disengaged from the engaging groove 321 after the engaging member 330 rotates along the shaft pin 350. The elastic element 340 provides an elastic force for engaging the engaging member 330 into the engaging groove 321, such that the rotation shaft 320 is connected with and locked to the wheel 310. The elastic element 340 is a compression spring, and has one end pressing against the engaging member 330 and the other end pressing against the wheel 310. When the engaging member 330 is disengaged from the engaging groove 321, the rotation shaft 320 may be unlocked and separated from the wheel 310.

Figure 16:
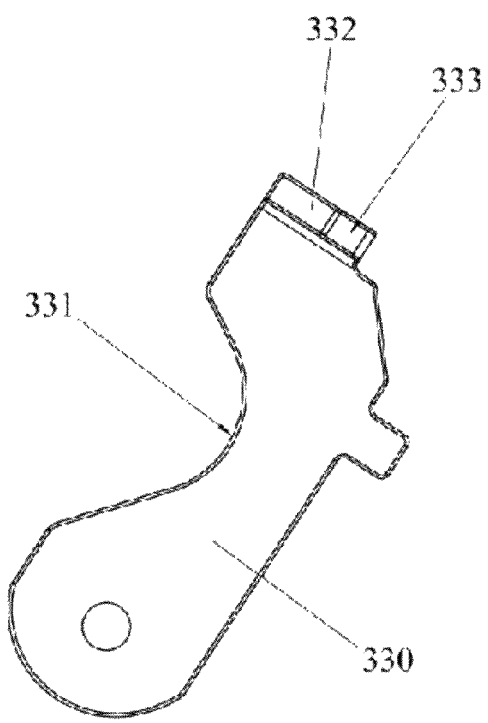
FIG. 16 is a structural diagram of the engaging member according to the third embodiment of the present disclosure.

Further as shown in FIG. 16, a pushing portion 332 extends from one side of the engaging member 330. The pushing portion 332 includes a matching inclined surface 333. The easy assembling and disassembling wheel component 300 further includes a wheel cover 360. The wheel cover 360 is arranged in the middle of the wheel 310 and may be slid along the center axis direction of the rotation shaft 320. The wheel cover 360 includes a driving portion 361, the driving portion 361 includes a driving inclined surface 362, and the driving inclined surface 362 is slidably abuts against the matching inclined surface 333. Pressing the wheel cover 360 along the axis direction of the rotation shaft 320 may make the driving portion 361 to drive the pushing portion 332, and thereby to drive the engaging member 330 to swing around shaft pin 350. The arrangement of the wheel cover 360 may not only shield the engaging member 330 to make the appearance of the wheel 310 more beautiful and generous, but also be used as an operating member for operating the engaging member 330, thereby improving the convenience of operation. The use of the driving inclined surface 362 and the matching inclined surface 333 may allow the wheel cover 360 to drive the engaging member 330 smoothly, and further improve the convenience of operation.

Figure 17:
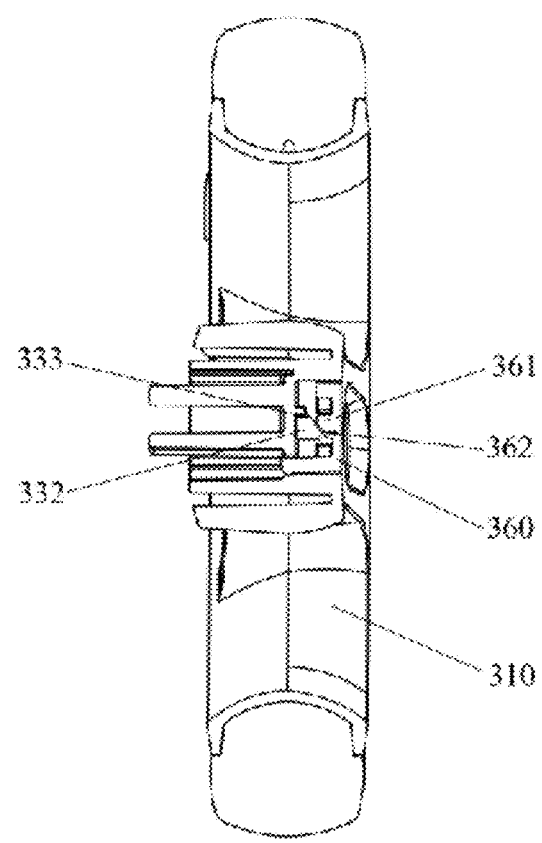
FIG. 17 is a state diagram of the easy assembling and disassembling wheel component according to the third embodiment of the present disclosure before the wheel cover being pressed.

As shown in FIG. 17, when the wheel 310 needs to be assembled and locked, it is only necessary to press and turn the wheel cover 360, and then the wheel cover 360 pushes the engaging member 330 to swing, such that the engaging region 331 is separated from the mounting hole 312. At this time, the rotation shaft 320 may passes through the mounting hole 312, and the wheel 310 is sleeved on the rotation shaft 320. After that, the engaging member 330 is released, and the engaging member 330 is rotated and restored under the elastic force of the elastic element 340. At this time, the engaging region 331 directly faces the mounting hole 312, and the edge of the engaging region 331 is engaged in the engaging groove 321. Then, the rotation shaft 320 cannot get out of the mounting hole 312 due to the complete locking of the engaging member 330, and then the rotation shaft 320 may be connected with and locked to the wheel 310.

Figure 18:
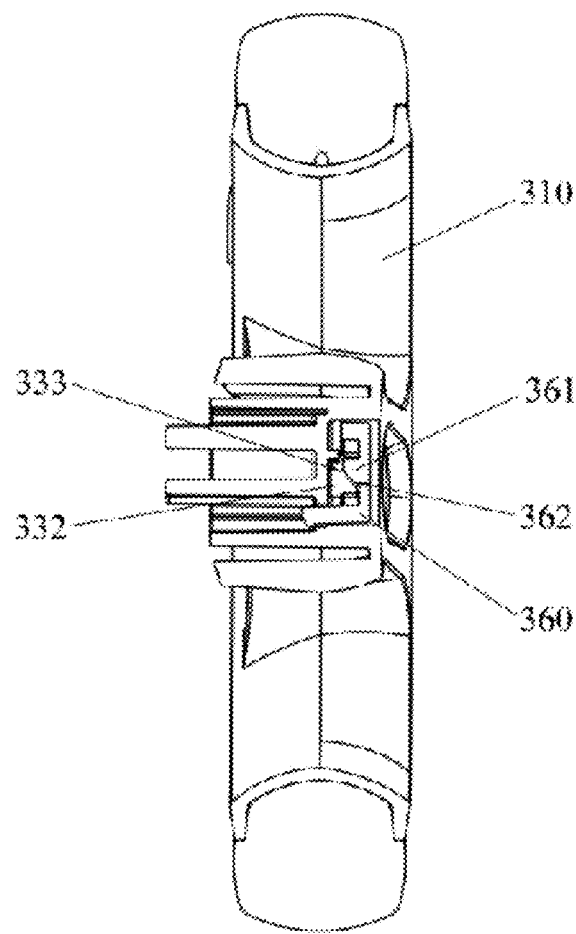
FIG. 18 is a state diagram of the easy assembling and disassembling wheel component according to the third embodiment of the present disclosure after the wheel cover being pressed.
Figure 19:
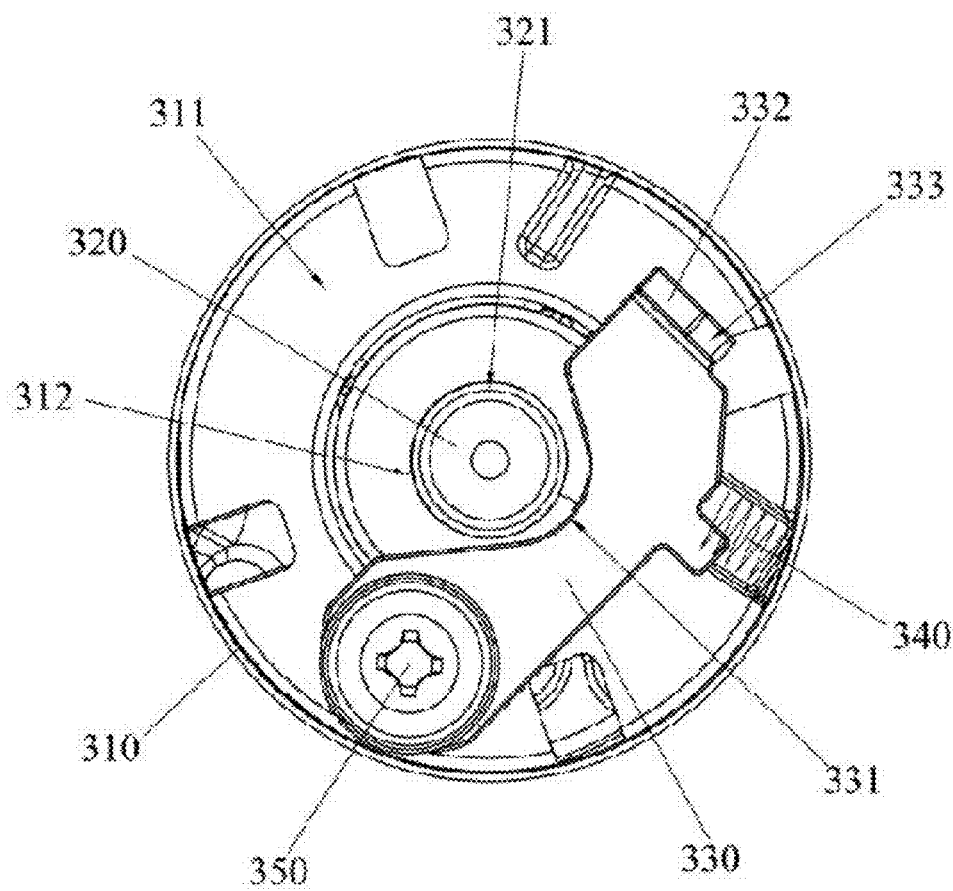
FIG. 19 is a state diagram of the easy assembling and disassembling wheel component according to the third embodiment of the present disclosure when being unlocked.

As shown in FIGS. 18-19, when the wheel 310 needs to be unlocked and disassembled, it is only necessary to press the wheel cover 360, and then the wheel cover 360 drives the engaging member 330, such that the engaging member 330 may swing and compress the elastic element 340 and the engaging region 331 is separated from the mounting hole 312. At this time, the rotation shaft 320 can be disengaged from the engaging member 330 and the mounting hole 312, and the wheel 310 can be disengaged from the rotation shaft 320.

Figure 20:
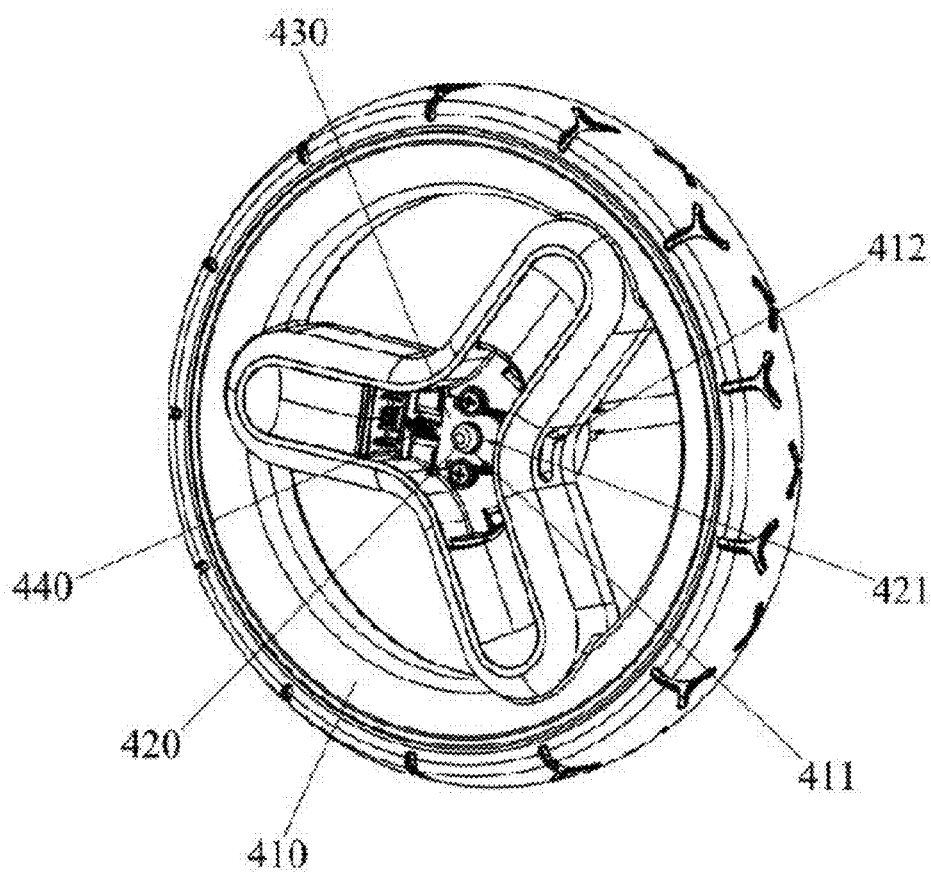
FIG. 20 is a structural diagram of an easy assembling and disassembling wheel component according to a fourth embodiment of the present disclosure.
Figure 21:
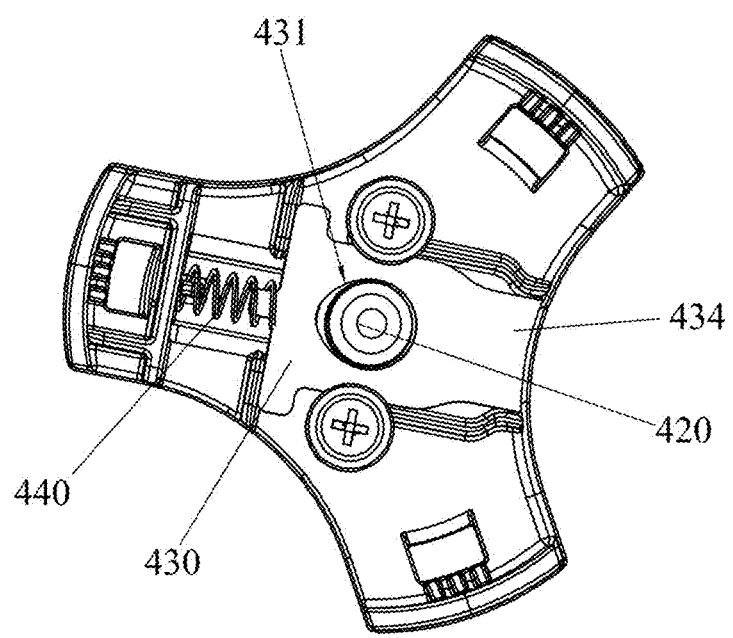
FIG. 21 is a structural diagram of an engaging member engaged on a rotation shaft according to the fourth embodiment of the present disclosure.
Figure 22:
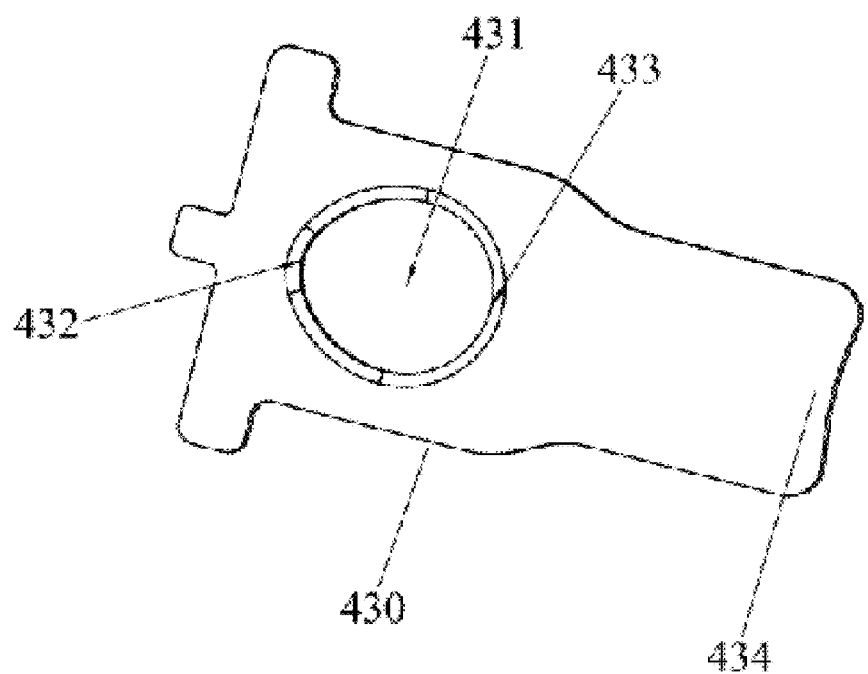
FIG. 22 is a structural diagram of the engaging member according to the fourth embodiment of the present disclosure.
Figure 23:
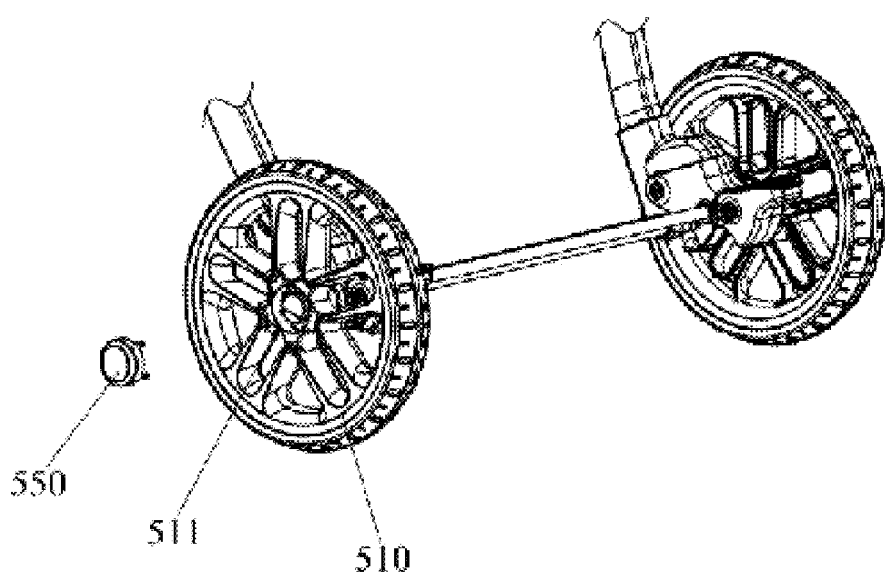
FIG. 23 is a state diagram of an easy assembling and disassembling wheel component according to a fifth embodiment of the present disclosure assembled on the frame.
Figure 24:
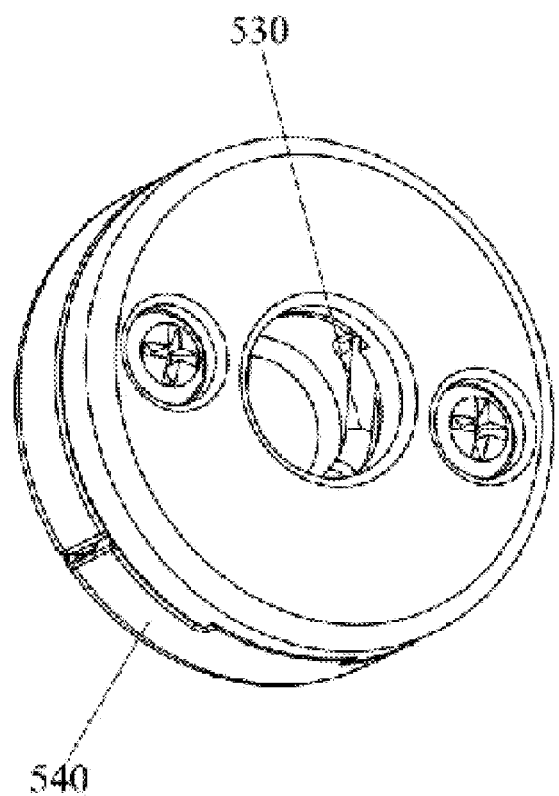
FIG. 24 is a state diagram of an operating member connected to a wheel according to the fifth embodiment of the present disclosure.
Figure 25:
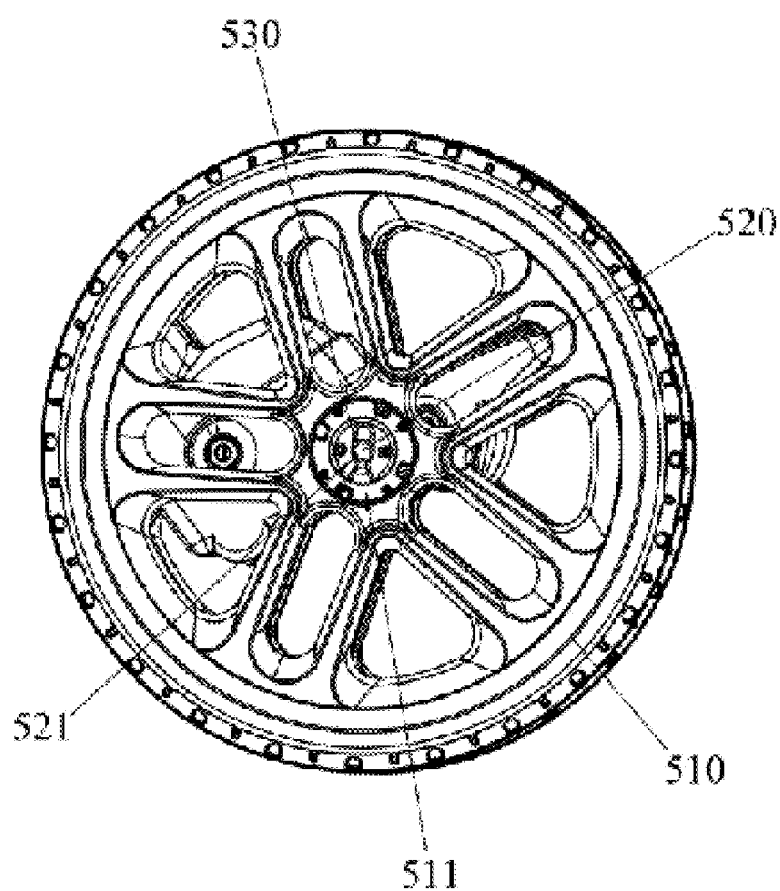
FIG. 25 is a structural diagram of the easy assembling and disassembling wheel component according to the fifth embodiment of the present disclosure.

As shown in FIGS. 20-22, the structure according to a fourth embodiment of the present disclosure is shown below.

Referring to FIGS. 20-21, the easy assembling and disassembling wheel component 400 according to the embodiment is basically the same as the second embodiment in structure, each including a wheel 410, a rotation shaft 420, an engaging member 430 and an elastic element 440. A mounting hole 411 is disposed on a center of the wheel

410. An annual engaging groove 421 is disposed on one end of the rotation shaft 420, and the rotation shaft 420 may extend into or get out of the mounting hole 411. The engaging member 430 is arranged on one side of the wheel 410 and may move along a radial direction of the wheel 410. The elastic element 440 is a compression spring. The differences lie in that the engaging member 430 includes an elongated hole 431 through which the rotation shaft 420 passes. One end of the elongated hole 431 includes a first engaging region 432, the other end of the elongated hole 431 includes a second engaging region 433, and the first engaging region 432 and the second engaging region 433 have different curvatures. Specifically, the edge of the first engaging region 432 is in a circular arc shape, and the diameter of the curved edge of the first engaging region 432 is smaller than the diameter of the rotation shaft 420. The edge of the second engaging region 433 is in a circular arc shape, and the diameter of the curved edge of the second engaging region 433 is larger than the diameter of the rotation shaft 420. The edge of the elongated hole 431 between the first engaging region 432 and the second engaging region 433 is arc-shaped. Thus, when the rotation shaft 420 is located at the first engaging region 432, the rotation shaft 420 can engage with the edge of the first engaging region 432; when the rotation shaft 420 is located at the second engaging region 433, the rotation shaft 420 may directly pass through the second engaging region 433 so as to disengage from the engaging member 430, for achieving the purpose of locking or unlocking. A pushing portion 434 extends from one side of the engaging member 430. A through hole 412 is disposed on the side of the hub of the wheel 410 facing the pushing portion 434. The pushing portion 434 can be pushed from the outside through the through hole 412, so as to push the engaging member 430 to slide.

As shown in FIG. 21, when the wheel 410 needs to be assembled and locked, it is only necessary to push the pushing portion 434, and then the second engaging region 433 directly faces the mounting hole 411. At this time, the rotation shaft 420 passes through the mounting hole 411 and the second engaging region 433, and the wheel 410 is sleeved on the rotation shaft 420. After that, the engaging member 430 is released, the engaging member 430 is restored under the elastic force of the elastic element 440. At this time, the engaging member 430 slides, the first engaging region 432 directly faces the mounting hole 411, and the edge of the first engaging region 432 is engaged in the engaging groove 421. Then, the rotation shaft 420 cannot get out of the mounting hole 411 due to the complete locking of the engaging member 430, and then the rotation shaft 420 may be connected with and locked to the wheel 410.

In combination with those shown in FIG. 21, when the wheel 410 needs to be unlocked and disassembled, it is only necessary to push the pushing portion 434, and then the second engaging region 433 directly faces the mounting hole 411. At this time, the rotation shaft 420 may be disengaged from the second engaging region 433 and the mounting hole 411, and the wheel 410 may be disengaged from the rotation shaft 420.

The present disclosure provides the engaging member 430, such that the engaging member 430 is movably disposed on the wheel 410. When the wheel 410 and the rotation shaft 420 are connected with each other, the engaging member 430 may be moved to the engaging groove 421 of the rotation shaft 420, and is engaged with the engaging groove 421, fur achieving the purpose of locking the wheel 410 and the rotation shaft 420; when the engaging member 430 is moved to disengaged from the engaging groove 421, the purpose of unlocking the wheel 410 and the rotation shaft 420 is achieved. Thus, the wheel 410 may be quickly assembled and disassembled by only operating the engaging member 430, which causes a simple structure and can achieve very convenient maintenance and use.

As shown in FIGS. 23-27, the structure according to a fifth embodiment of the present disclosure is shown below.

Referring to FIGS. 23-26, the easy assembling and disassembling wheel component 500 according to the embodiment includes a wheel 510, a rotation shaft 520 and an engaging member 530. An accommodating chamber 511 is disposed in the middle of the wheel 510, and a mounting hole 512 is disposed on a center of the accommodating chamber 511. An annual engaging groove 521 is disposed on one end of the rotation shaft 520, the rotation shaft 520 may extend into or get out of the mounting hole 512, and the engaging member 530 is arranged in the accommodating chamber 511 and has an elastic portion 531. Specifically, the engaging member 530 includes a U-shaped structure, two ends of which form the elastic portions 531. The elastic portion 531 is elastically locked into the engaging groove 521, so as to connect and lock the rotation shaft 520 and the wheel 510.

Figure 26:
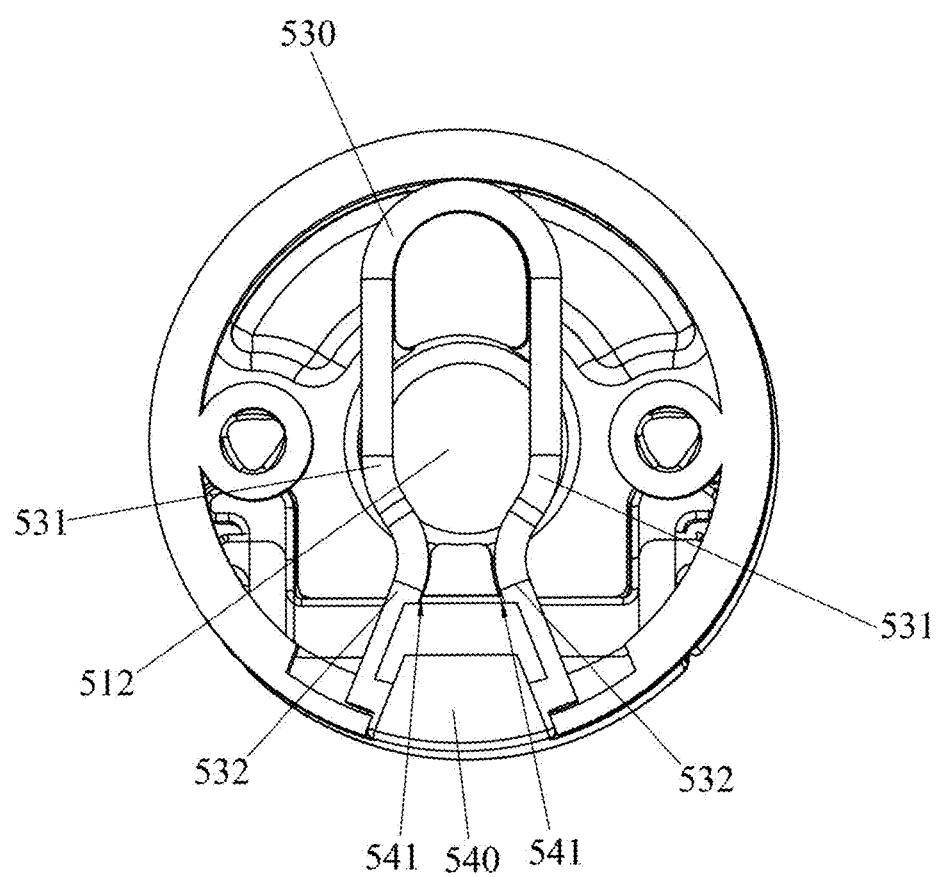
FIG. 26 is a structural diagram of an engaging member arranged on the wheel according to the fifth embodiment of the present disclosure.
Figure 27:
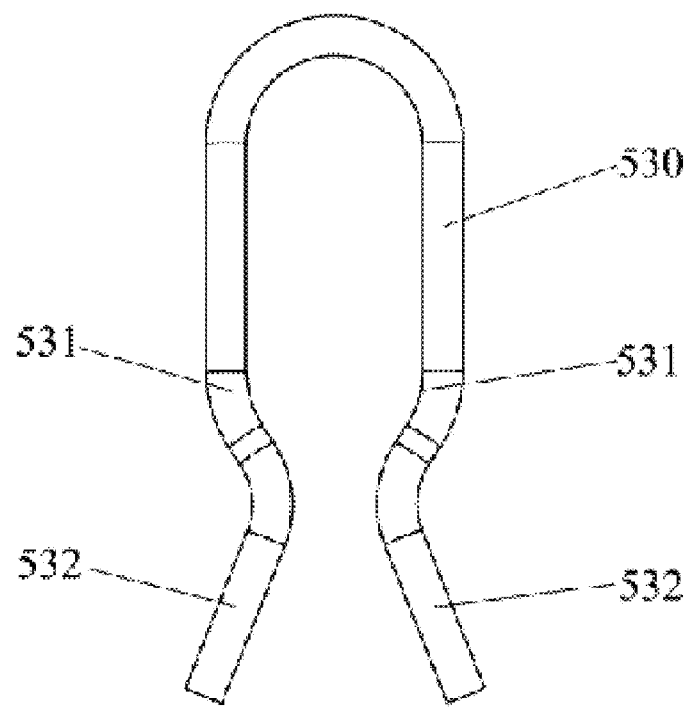
FIG. 27 is a structural diagram of the engaging member according to the fifth embodiment of the present disclosure.

Further referring to FIGS. 26-27, a tail end of the elastic portion 531 extends out of a guide portion 532. The easy assembling and disassembling wheel component 500 further includes an operating member 540, and the operating member 540 is arranged on one side of the wheel 510 and may slide along a radial direction of the wheel 510. The operating member 540 includes an oblique hole 541, and the guide portion 532 is slidably arranged in the oblique hole 541, so as to drive the elastic portions 531 to open. By providing the guide portion 532, the operating member 540 can more easily drive the elastic portion 531, thereby improving the convenience of operation.

The easy assembling and disassembling wheel component 500 further includes a wheel cover 550. The wheel cover 550 is arranged on the accommodating chamber 511 and covers the operating member 540. By providing the wheel cover 550, the engaging member 530 is shielded so as to make the appearance of the wheel 510 more beautiful and generous.

When the wheel 510 needs to be assembled and locked, it is necessary to press the operating member 540, so that the operating member 540 slides and pushes the guide portion 532. The guide portion 532 slides in the direction of the oblique hole 541, so as to make the elastic portions 531 to open and separate from the mounting hole 512. At this time, the rotation shaft 520 may pass through the mounting hole 512, and the wheel 510 is sleeved on the rotation shaft 520. After that, the operating member 540 is released, and the elastic portion 531 is restored under the elastic force. At this time, the elastic portion 531 is engaged in the engaging groove 521. The rotation shaft 520 cannot get out of the mounting hole 512 due to the complete locking of the engaging member 530, and then the rotation shaft 520 may be connected with and locked to the wheel 510.

When the wheel 510 needs to be unlocked and disassembled, it is only necessary to press the operating member 540, such that the operating member 540 slides and pushes the guide portion 532. The guide portion 532 is slid in a direction of the oblique hole 541 so as to make the elastic portions 531 to open and separate from the mounting hole 512. At this time, the rotation shaft 520 may be disengaged from the engaging member 530 and the mounting hole 512, and then the wheel 510 may be disengaged from the rotation shaft 520.

The present disclosure provides the engaging member 530, such that an elastic portion 531 is disposed on one end of the engaging member 530. By using the spring-back property of the elastic portion 531, when the elastic portion 531 is in a natural state, the elastic portion 531 may spring back and be engaged in the engaging groove 521 of the rotation shaft 520, so as to connect and lock the rotation shaft 520 and the wheel 510; when the elastic portions 531 are opened under force, the elastic portions 531 may get out of the engaging groove 521 of the rotation shaft 520 so as to unlock the rotation shaft 520 and the wheel 510, for achieving the purpose of unlocking the wheel 510 and the rotation shaft 520. Thus, the wheel 510 may be quickly assembled and disassembled by only operating the elastic portion 531, which causes a simple structure and can achieve very convenient maintenance and use.

As shown in FIGS. 28-31, the structure according to a sixth embodiment of the present disclosure is shown below.

Figure 28:
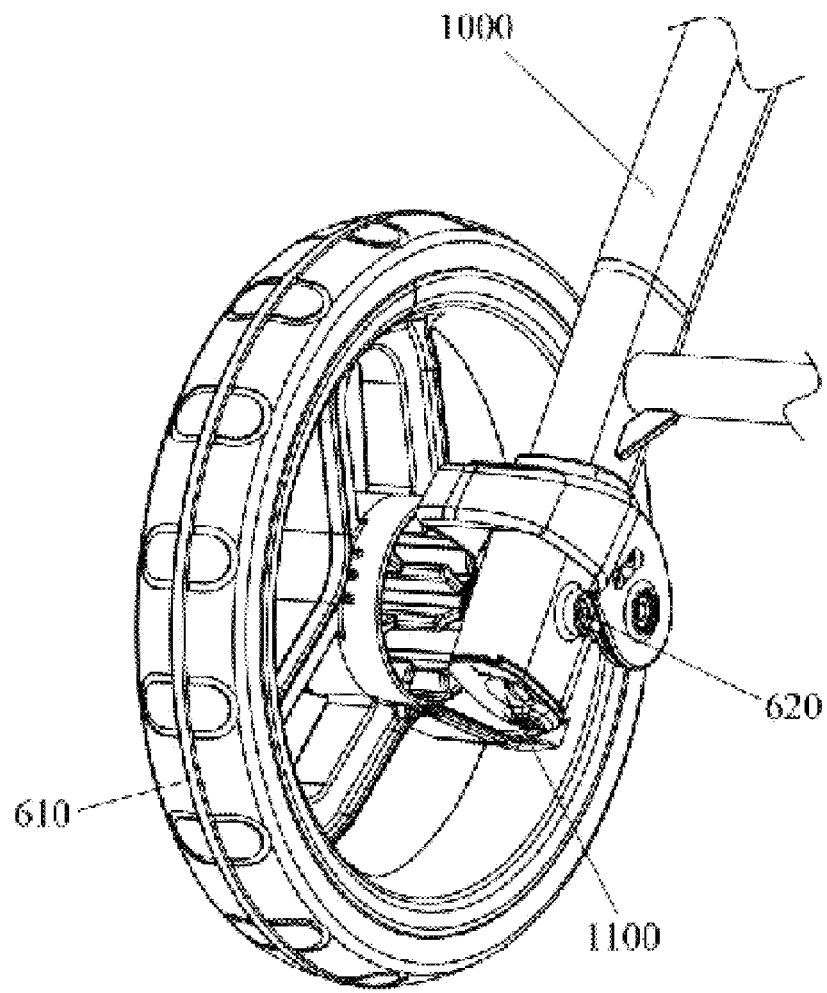
FIG. 28 is a state diagram of an easy assembling and disassembling wheel component according to a sixth embodiment of the present disclosure assembled on the frame.
Figure 29:
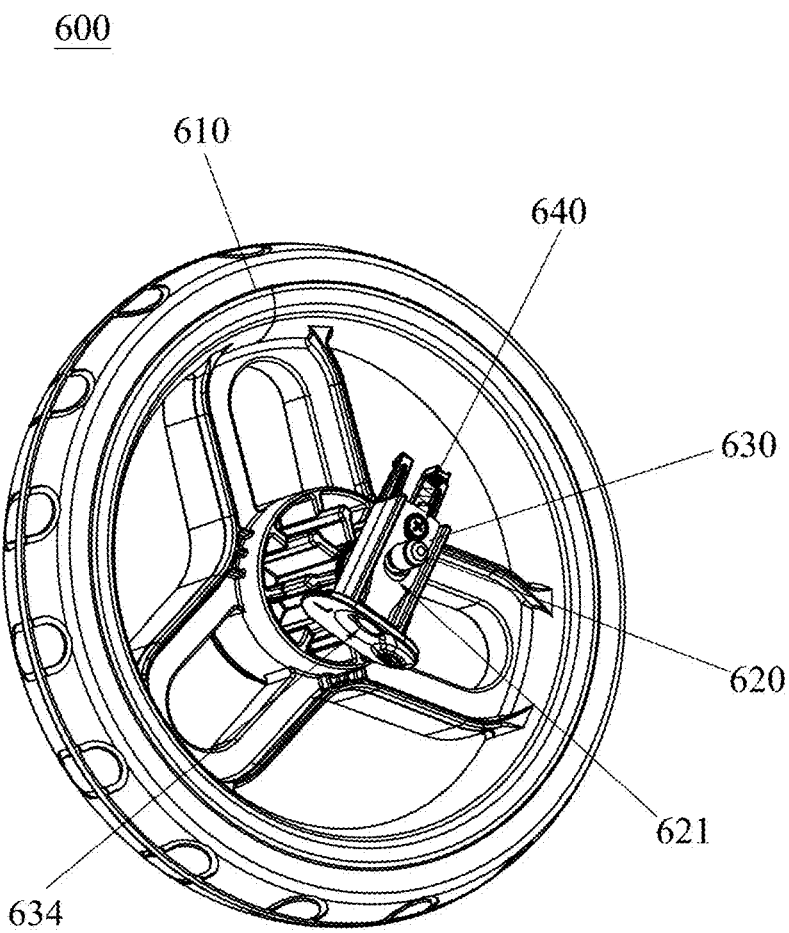
FIG. 29 is a structural diagram of the easy assembling and disassembling wheel component according to the sixth embodiment of the present disclosure.
Figure 30:
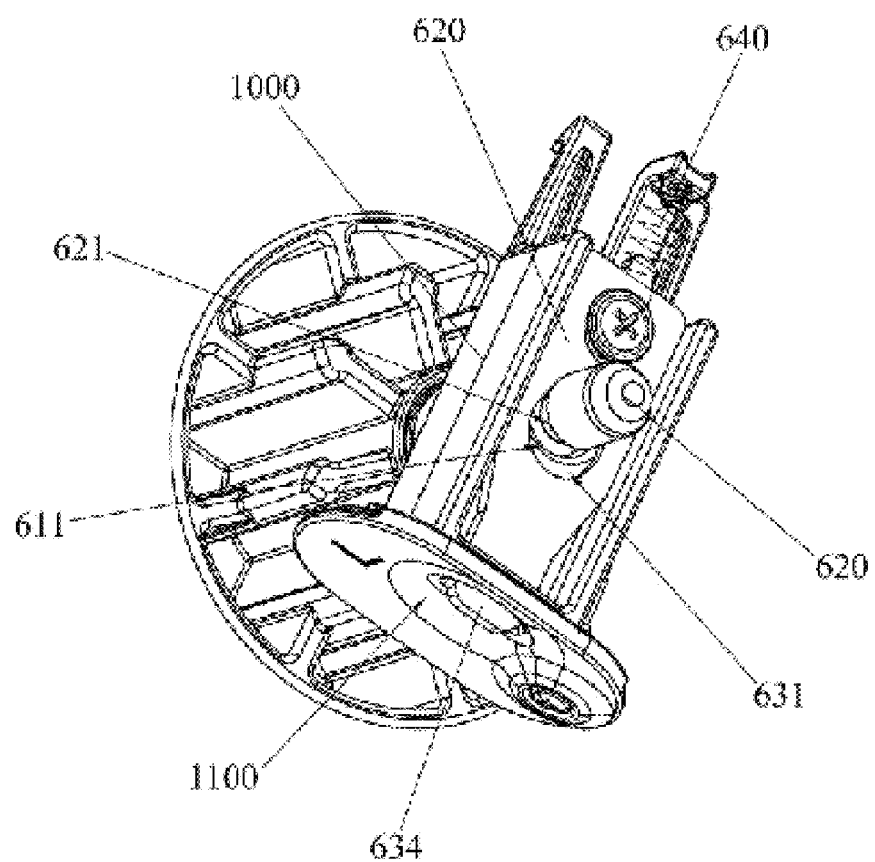
FIG. 30 is a structural diagram of an engaging member connected to a rotation shaft according to the sixth embodiment of the present disclosure.

Referring to FIGS. 28-30, the easy assembling and disassembling wheel component 600 according to the embodiment includes a wheel 610, a rotation shaft 620, an engaging member 630 and an elastic element 640. A center of the wheel 610 and one end of the rotation shaft 620 are fixedly connected. The other end of the rotation shaft 620 includes an engaging groove 621 and may extend into or get out of a mounting hole 611 of a supporting foot 1000 of a frame. The engaging member 630 is movably arranged on the supporting foot 1000. The elastic element 640 provides an elastic force for engaging the engaging member 630 into the engaging groove 621, so as to connect and lock the rotation shaft 620 and the supporting foot 1000. The elastic element 640 is a compression spring, one end of which is pressed against the engaging member 630, and the other end of which is pressed against the supporting foot 1000. When the engaging member 630 is disengaged from the engaging groove 621, the rotation shaft 620 is unlocked and separated from the supporting foot 1000.

Figure 31:
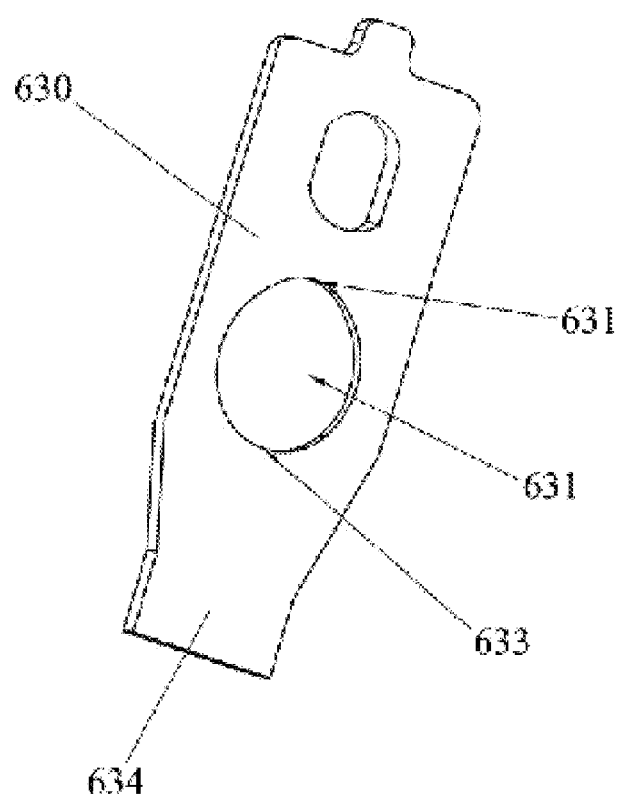
FIG. 31 is a structural diagram of the engaging member according to the sixth embodiment of the present disclosure.

Further referring to FIG. 31, the engaging member 630 includes an elongated hole 631 through which the rotation shaft 620 passes. One end of the elongated hole 631 includes a first engaging region 632, the other end thereof includes a second engaging region 633, and the first engaging region 632 and the second engaging region 633 have different curvatures. Specifically, the diameter of the curved edge of the first engaging region 632 is smaller than the diameter of the rotation shaft 620, and the diameter of the curved edge of the second engaging region 633 is larger than the diameter of the rotation shaft 620. Thus, when the rotation shaft 620 is located at the first engaging region 632, the rotation shaft 620 is engaged with the edge of a first engaging region 632; while, when the rotation shaft 620 is located at a second engaging region 633, the rotation shaft 620 may pass through the second engaging region 633 and be disengaged from the engaging member 630, for achieving the purpose of locking or unlocking. One end of the engaging member 630 includes a pushing portion 634, and the bottom of the supporting foot 1000 includes a through hole 1100. The through hole 1100 directly faces the pushing portion 634, and the engaging member 630 may be pushed to slide via the through hole 1100.

As shown in FIG. 30, when the wheel 610 needs to be assembled and locked, it is only necessary to push the pushing portion 634, such that the second engaging region 633 directly faces the mounting hole 611. At this time, the rotation shaft 620 passes through the second engaging region 633 and the mounting hole 611 of the supporting foot 1000. After that, the engaging member 630 is released, and the engaging member 630 is restored under the elastic force of the elastic element 640. At this time, the engaging member 630 slides, the first engaging region 632 directly faces the mounting hole 611, and the edge of the first engaging region 632 is engaged in the engaging groove 621. Thus, the rotation shaft 620 cannot get out of the mounting hole 611 due to the complete locking of the engaging member 630, the wheel 610 and the rotation shaft 620 may be connected with and locked to the supporting foot 1000.

As shown in FIG. 30, when the wheel 610 needs to be unlocked and disassembled, it is necessary to push the pushing portion 634, such that the second engaging region 633 directly faces the mounting hole 611. At this time, the rotation shaft 620 may be disengaged from the second engaging region 633 and the mounting hole 611, and the wheel 610 and the rotation shaft 620 may be disengaged from the supporting foot 1000.

The present disclosure provides an engaging member 630, for connecting the wheel 610 and the rotation shaft 620. The engaging member 630 is movably disposed on the supporting foot 1000. When the rotation shaft 620 and the supporting foot 1000 are connected, the engaging member 630 may be moved to the engaging groove 621 of the rotation shaft 620, and be engaged in the engaging groove 621, for achieving the purpose of locking the wheel 610. When the engaging member 630 is moved to disengage from the engaging groove 621, the purpose of unlocking the wheel 610 is achieved. Thus, the wheel 610 may be quickly assembled and disassembled by only operating the engaging member 630, which causes a simple structure and can achieve very convenient maintenance and use.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A wheel component, comprising a wheel, a rotation shaft and an engaging member, wherein a mounting hole is disposed on a center of the wheel, an accommodating groove is disposed on one end of the rotation shaft, the engaging member is movably engaged in the accommodating groove and is swingable between a first position and a second position, when the engaging member is in the first position, the engaging member and the rotation shaft can pass through the mounting hole of the wheel; when the engaging member is in the second position, the rotation shaft is connected with and locked to the wheel, wherein the engaging member has an elongated ring-shaped structure, an elongated hole is formed in a middle of the engaging member, an engaging region is disposed in a middle of the elongated hole, two arc-shape hole regions are formed on two lateral sides of the elongated hole, and an edge of the engaging member is in a corrugated structure to form the engaging region and has an elastic force, a connection portion is disposed in the accommodating groove and passes through the engaging member;

wherein, when the connection portion reaches the corrugated structure, the corrugated structure is elastically stretched and allows the connection portion to pass through;

wherein, when the connection portion passes over the corrugated structure, the corrugated structure springs back and the engaging region engages with the connection portion.

2. The wheel component according to claim 1, wherein the accommodating groove penetrates two lateral surfaces and an end surface of the rotation shaft, and a connection portion is disposed in the accommodating groove and passes through the engaging member.

3. The wheel component according to claim 1, wherein the first position is a position to which the engaging member is swung such that a length direction of the engaging member is the same as a central axis extension direction of the rotation shaft; the second position is a position to which the engaging member is swung such that the length direction of the engaging member intersects with the central axis extension direction of the rotation shaft and the engaging member presses against an edge of the mounting hole.

4. The wheel component according to claim 1, wherein an elongated hole is formed in the middle of the engaging member, an engaging region is disposed in the middle of the elongated hole, and the connection portion is engaged with the engaging region when the rotation shaft is locked on the wheel.

5. The wheel component according to claim 2, wherein the connection portion is a connection shaft.

6. The wheel component according to claim 1, further comprising a wheel cover for covering one side of the wheel to shield the engaging member; and a positioning rib for positioning the engaging member is disposed on an inner side of the wheel cover.

\* \* \* \* \*